United States Patent
Kundu et al.

(10) Patent No.: US 11,265,853 B2
(45) Date of Patent: Mar. 1, 2022

(54) MULTIPLEXING OF MULTIPLE UPLINK CONTROL INFORMATION TYPES ON AN UPLINK PHYSICAL CONTROL CHANNEL IN NEW RADIO

(71) Applicant: Apple Inc., Cupertino, CA (US)

(72) Inventors: Lopamudra Kundu, Santa Clara, CA (US); Gang Xiong, Portland, OR (US); Joonyoung Cho, Portland, OR (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/408,372

(22) Filed: May 9, 2019

(65) Prior Publication Data

US 2019/0373598 A1    Dec. 5, 2019

Related U.S. Application Data

(63) Continuation of application No. 16/376,534, filed on Apr. 5, 2019.
(Continued)

(51) Int. Cl.
*H04W 72/04* (2009.01)
*H04L 1/18* (2006.01)
(Continued)

(52) U.S. Cl.
CPC ...... *H04W 72/0413* (2013.01); *H04B 7/0486* (2013.01); *H04B 7/0626* (2013.01); *H04B 7/0632* (2013.01); *H04B 7/0639* (2013.01); *H04L 1/1819* (2013.01); *H04L 5/0055* (2013.01); *H04W 72/10* (2013.01)

(58) Field of Classification Search
CPC .... H04L 1/1671; H04L 1/1812–1/1825; H04L 1/1887; H04L 1/1893; H04L 1/1896; H04L 5/0042; H04L 5/0053–5/0058; H04B 7/0626; H04B 7/0632; H04B 7/0636; H04W 72/0413; H04W 72/1289
See application file for complete search history.

(56) References Cited

U.S. PATENT DOCUMENTS

| 2013/0230033 A1 | 9/2013 | Lee et al. |
| 2016/0020875 A1 | 1/2016 | Seo et al. |

(Continued)

OTHER PUBLICATIONS

Intel Corporation, "Handling collision between HARQ-ACK/SR and CSI," 3GPP TSG RAN WG1 Meeting #92bis, R1-1804728, Agenda item: 7.1.3.2.1, Apr. 16-20, 2018, Sanya, China, 8 pages.

*Primary Examiner* — Pao Sinkantarakorn
(74) *Attorney, Agent, or Firm* — Sterne, Kessler, Goldstein & Fox P.L.L.C.

(57) ABSTRACT

Embodiments of the present disclosure describe methods, apparatuses, storage media, and systems for determining that a first physical uplink control channel (PUCCH) resource and a second PUCCH resource at least partially overlap, where the first PUCCH resource has a payload of a first size carrying a first uplink control information (UCI) in a first format, and the second PUCCH resource has a payload of a second size carrying a second UCI in a second format. Furthermore, the first UCI and the second UCI are multiplexed to form a combined payload to be carried by the first PUCCH resource in the first format or by the second PUCCH resource in the second format. Other embodiments may be described and claimed.

22 Claims, 15 Drawing Sheets

Related U.S. Application Data

(60) Provisional application No. 62/654,000, filed on Apr. 6, 2018.

(51) Int. Cl.
    *H04L 5/00*         (2006.01)
    *H04B 7/06*         (2006.01)
    *H04B 7/0456*     (2017.01)
    *H04W 72/10*      (2009.01)

(56) References Cited

U.S. PATENT DOCUMENTS

| | | | |
|---|---|---|---|
| 2018/0234225 A1* | 8/2018 | Yokomakura | H04W 72/0413 |
| 2018/0270794 A1 | 9/2018 | Tiirola et al. | |
| 2018/0331743 A1* | 11/2018 | Shen | H04B 7/0626 |
| 2018/0359057 A1 | 12/2018 | Yang et al. | |
| 2019/0158332 A1* | 5/2019 | Akkarakaran | H04L 1/1887 |
| 2019/0159231 A1 | 5/2019 | Soriaga et al. | |
| 2019/0239216 A1 | 8/2019 | Kundu et al. | |
| 2019/0261356 A1* | 8/2019 | Myung | H04W 88/06 |
| 2020/0084761 A1* | 3/2020 | Baldemair | H04L 1/0026 |
| 2020/0146037 A1* | 5/2020 | Park | H04W 72/1278 |
| 2020/0163081 A1 | 5/2020 | Kim et al. | |
| 2020/0404692 A1 | 12/2020 | Yin et al. | |

\* cited by examiner

MULTIPLEXING OF MULTIPLE UPLINK CONTROL INFORMATION TYPES ON AN UPLINK PHYSICAL CONTROL CHANNEL IN NEW RADIO

CROSS REFERENCE TO RELATED APPLICATION

The present application is a continuation of U.S. patent application Ser. No. 16/376,534, filed Apr. 5, 2019, entitled "MULTIPLEXING OF MULTIPLE UPLINK CONTROL INFORMATION TYPES ON AN UPLINK PHYSICAL CONTROL CHANNEL IN NEW RADIO," which claims priority from U.S. Provisional Patent Application No. 62/654,000, filed Apr. 6, 2018, and entitled "MULTIPLEXING OF MULTIPLE UPLINK CONTROL INFORMATION TYPES ON AN UPLINK PHYSICAL CONTROL CHANNEL IN NEW RADIO," the entire disclosures of which are hereby incorporated by reference in their entireties.

FIELD

Embodiments of the present invention relate generally to the technical field of wireless communications.

BACKGROUND

Mobile communication has evolved significantly from early voice systems to today's highly sophisticated integrated communication platform. The next generation wireless communication system, which may be referred to as 5G or new radio (NR), may provide access to information in sharing of data anywhere, any time by various users and applications. NR is expected to be a unified network/system that meets vastly different and sometimes conflicting performance dimensions and services. Such diverse multi-dimensional requirements may be driven by different services and applications. In general, NR will evolve based on $3^{rd}$ Generation Partnership Project (3GPP) LTE-Advanced with additional potential new Radio Access Technologies (RATs) to improve wireless connectivity solutions. NR may enable ubiquitous wireless connections the deliver fast and Rich content in services.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrases "A or B" and "A and/or B" mean (A), (B), or (A and B). For the purposes of the present disclosure, the phrases "A, B, or C" and "A, B, and/or C" mean (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The description herein of illustrated implementations, including what is described in the Abstract, is not intended to be exhaustive or to limit the present disclosure to the precise forms disclosed. While specific implementations and examples are described herein for illustrative purposes, a variety of alternate or equivalent embodiments or implementations calculated to achieve the same purposes may be made in light of the above detailed description, without departing from the scope of the present disclosure, as those skilled in the relevant art will recognize.

In general, new radio (NR) will evolve based on $3^{rd}$ Generation Partnership Project (3GPP) LTE-Advanced with additional potential new Radio Access Technologies (RATs) to enrich people lives with better, simple and seamless wireless connectivity solutions. NR may enable everything connected by wireless and deliver fast, rich contents and services.

Figure 1:
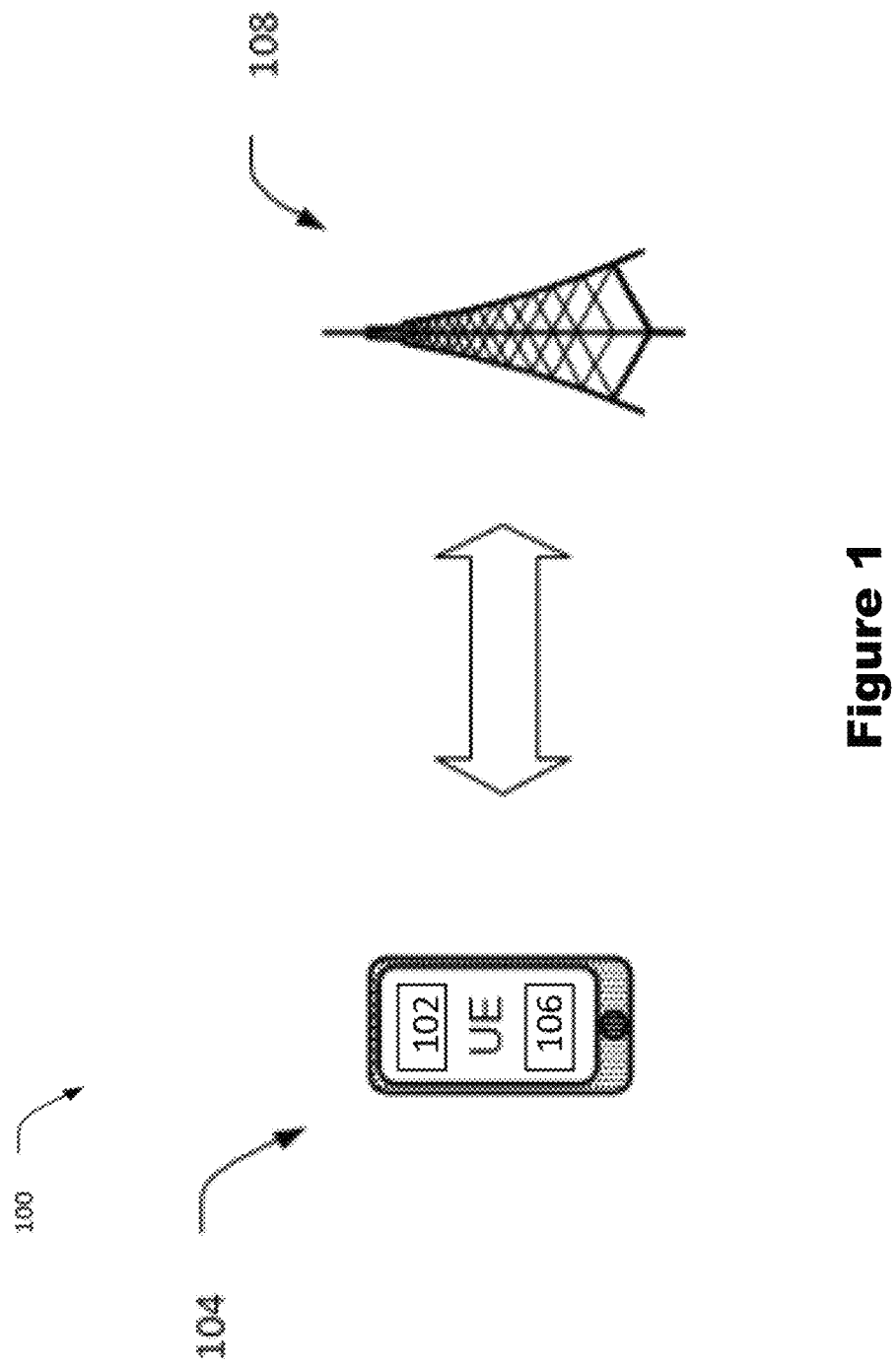
FIG. 1 illustrates a simplified network in accordance with some embodiments.

FIG. 1 illustrates a simplified network or a wireless communication system 100 in accordance with some embodiments. The network 100 may include a user equipment (UE) 104 communicatively coupled with an access node or a base station, e.g., a Next Generation NodeB (gNB) 108. The UE 104 and access node or base station 108 may correspond to and be substantially interchangeable with like-named elements described with respect to FIGS. 5-13.

In embodiments, the network 100 may be a 5G NR system. A NR system may support a large variety of frequency bands ranging from sub-GHz to 100 GHz. 5G NR system uses physical uplink control channel (PUCCH), physical uplink shared channel (PUSCH), physical downlink control channel (PDCCH), and physical downlink shared channel (PDSCH) between the UE 104 and the base station 108 to perform various communications, e.g., data transfer, physical layer control functions such as scheduling the downlink (DL) broadcast and DL/uplink (UL) unicast data transmission, and signaling various triggers for aperiodic and periodic transmission/reception. However, various design elements of NR make PUCCH, PUSCH, PDCCH, and PDSCH for a NR system different from the corresponding designs in LTE.

In detail, the UE 104 may include a processing circuitry 102 and a network controller circuitry 106. In embodiments, the processing circuitry 102 may be implemented by, application circuitry 705 or 805, or baseband circuitry 710 or 810, as shown in FIGS. 5-13. The network controller circuitry 106 may be implemented by, for example, radio frontend module 715 or 815, or network controller circuitry 735, or antenna 920, as shown in FIGS. 5-13.

Figure 2:
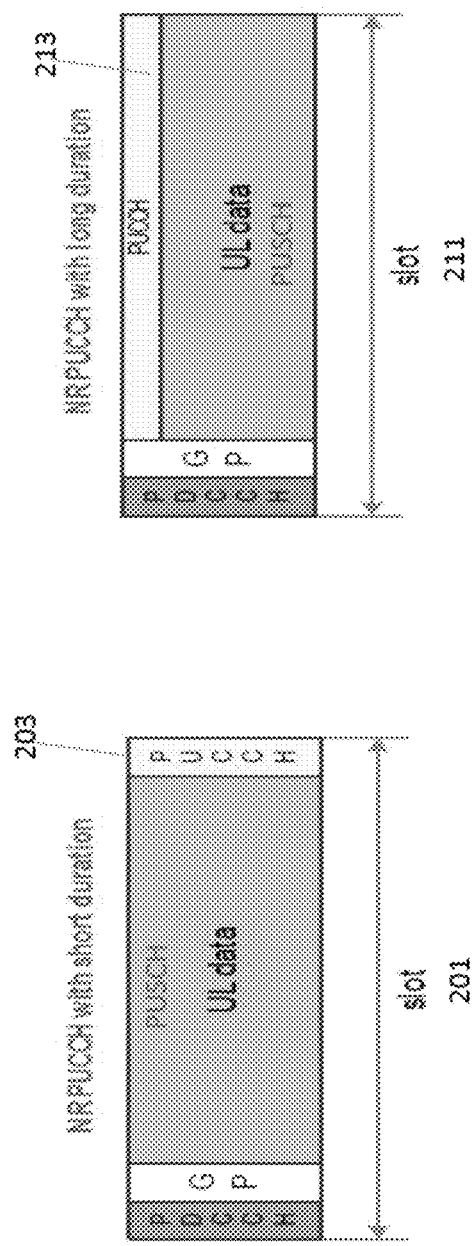
FIG. 2 illustrates an example of a NR physical uplink control channel (PUCCH) with short and long duration within an uplink (UL) data slot, where the UL data may be carried by a physical uplink shared channel (PUSCH), in accordance with some embodiments.

NR physical uplink control channel (PUCCH) with short and long duration within uplink (UL) data slot may be shown in FIG. 2. The UL data may be carried by a PUSCH. For a NR PUCCH 203 with short duration within a slot 201, NR PUCCH and the data slot in PUSCH are multiplexed in a time division multiplexing (TDM) manner, which can be targeted for low latency application. For a NR PUCCH 213 with long duration within a time slot 211, multiple orthogonal frequency division multiplex (OFDM) symbols can be allocated for NR PUCCH to improve link budget and uplink coverage for control channel. More specifically, for UL data slot, NR PUCCH and PUSCH can be multiplexed in a frequency division multiplexing (FDM) fashion. As shown, the duration of the NR PUCCH 213 is longer than the duration of the NR PUCCH 203. In addition, in order to accommodate the downlink (DL) to UL and UL to DL switching time and round-trip propagation delay, a guard period (GP) is inserted between NR physical downlink shared channel (NR PDSCH) and NR physical uplink control channel (NR PUCCH) as well as NR physical downlink control channel (NR PDCCH) and NR physical uplink shared channel (NR PUSCH).

In NR, uplink control information (UCI) may be carried by PUCCH or PUSCH. In particular, UCI may include scheduling request (SR), hybrid automatic repeat request—acknowledgement (HARQ-ACK) feedback, or channel state information (CSI) report, e.g., channel quality indicator (CQI), pre-coding matrix indicator (PMI), CSI resource indicator (CRI) and rank indicator (RI) and/or beam related information (e.g., layer 1-reference signal received power (L1-RSRP)). In some embodiments, the CSI report includes multiple PUCCH based wideband or sub-band CSI reports. The HARQ-ACK feedback is scheduled by a physical downlink shared channel (PDSCH), or generated periodically without being scheduled by a PDSCH. For some embodiments, the HARQ-ACK feedback is in response to a physical downlink shared channel (PDSCH) reception without a corresponding physical downlink control channel (PDCCH) reception. Moreover, for some embodiments, the HARQ-ACK feedback is in response to a physical downlink control channel (PDCCH) reception indicating semi-persistently scheduled (SPS) PDSCH release.

In NR, short PUCCH or short PUCCH resource (PUCCH formats 0 and 2) can span 1 or 2 symbol(s) and long PUCCH (PUCCH formats 1, 3 and 4) can span from 4 to 14 symbols within a slot. Further, long PUCCH may span multiple slots to further enhance the coverage. PUCCH formats 0 and 1 carry small payload size (e.g., 1~2 bits) and PUCCH formats 2/3/4 carry large payload size (e.g., >2 bits). Hence, among short PUCCH formats (e.g., formats 0 and 2), one carries small payload (format 0) and the other can carry large payload (format 2). Similarly, among long PUCCH formats (e.g., formats 1/3/4), one carries small payload (format 1) and the other two can carry moderate (format 4) to large (format 3) payload. In embodiments, for a given UE, two short PUCCHs as well as short PUCCH and long PUCCH can be multiplexed in a TDM manner in a same slot.

There may be cases where a PUCCH resource (using formats 2/3/4) carrying large payload (>2 bits) partially overlaps with a PUCCH resource (using formats 0/1) carrying small payload (1~2 bits). The large payload may comprise of various combinations of UCIs: e.g., CSI reports, HARQ-ACK+CSI reports, Only HARQ-ACK (in this case more than 2 bits of HARQ-ACK). A large payload size may be larger than 2 bits no matter what UCI types it comprises of. The small payload may comprise of fewer combinations: only HARQ-ACK (1~2 bits), only SR (1 bit), HARQ-ACK+SR (1~2 bits). Small payload may have only 1 or 2 bits for some examples.

In embodiments, as shown in FIG. 1, the processing circuitry 102 of the UE 104 may perform various functions, e.g., to determine a first physical uplink control channel (PUCCH) resource with a payload of a first size carrying a first uplink control information (UCI) in a first format; determine a second PUCCH resource with a payload of a second size carrying a second UCI in a second format; determine that the first PUCCH resource and the second PUCCH resource at least partially overlap; and multiplex the first UCI and the second UCI to obtain a combined payload to be carried by the first PUCCH resource in the first format or by the second PUCCH resource in the second format. In some embodiments, the combined payload may be carried by a number of physical resource blocks (PRBs) smaller than a predetermined or preconfigured number of PRBs. In some other embodiments, the combined payload is carried by a number of physical resource blocks (PRBs) that is determined by the base station and signaled to the user equipment (UE) through a high layer signaling. Furthermore, the combined payload may be carried by a number of physical resource blocks (PRBs) with indices that can be factorized into the form $2^i \cdot 3^j \cdot 5^k$, with i, j, k being integers. In addition, the network controller circuitry 106 of the UE 104 may be coupled with the processing circuitry 102 to deliver to the base station 108 the combined payload carried by the first PUCCH resource in the first format or by the second PUCCH resource in the second format.

In embodiments, the first PUCCH resource may be determined based on a PUCCH resource indicator field in a downlink control information (DCI). When the first size of the payload in the first PUCCH resource is larger than the second size of the payload in the second PUCCH resource, the processing circuitry 102 of the UE 104 may multiplex the first UCI and the second UCI to be carried by the first PUCCH resource in the first format. For example, the processing circuitry 102 of the UE 104 may append the second UCI to the first UCI to form a combined payload carried by the first PUCCH resource in the first format. In some embodiments, the processing circuitry 102 of the UE 104 may drop at least a part of the first UCI or the second UCI depending on a pre-defined priority rule to form a combined payload carried by the first PUCCH resource in the first format. The first format is of a format to carry a payload of a larger size, and the second format is of a format to carry a payload of a smaller size. The first format is of a format 2, 3, or 4 for a PUCCH resource, and the second format is of format 0 or 1 for a PUCCH resource.

In embodiments, as shown in FIG. 1, the base station 108 may determine a first configuration for a first physical uplink control channel (PUCCH) resource with a payload of a first size carrying a first uplink control information (UCI) in a first format from the UE 104; determine a second configuration for a second PUCCH resource with a payload of a second size carrying a second UCI in a second format from the UE 104, wherein the first PUCCH resource and the second PUCCH resource at least partially overlap; indicate the first configuration and the second configuration to the UE 104. In addition, the base station 108 may be caused to indicate the first configuration and the second configuration to the UE 104 by a high layer signaling; and receive a combined payload from the UE 104 carried by the first PUCCH resource in the first format or by the second PUCCH resource in the second format, wherein the combined payload is obtained by multiplexing the first UCI and the second UCI.

Figure 3A:
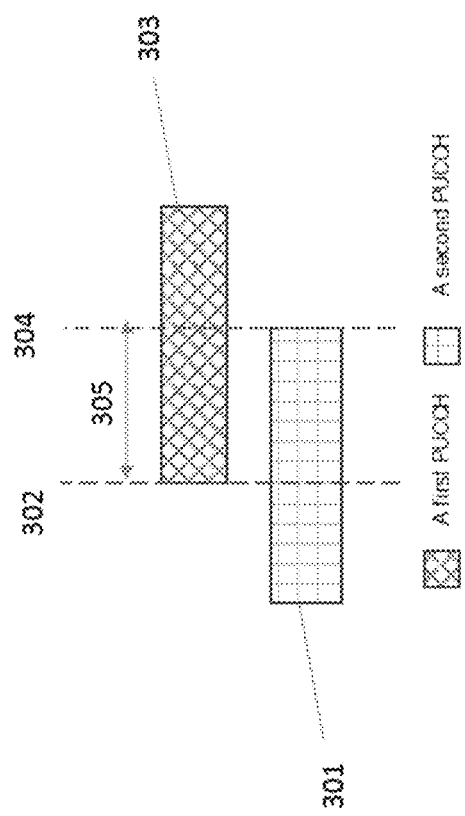
FIG. 3(*a*)-3(*b*) illustrate examples to multiplex overlapping PUCCH resources carrying uplink control information (UCI) in different formats in accordance with some embodiments.
Figure 3B:
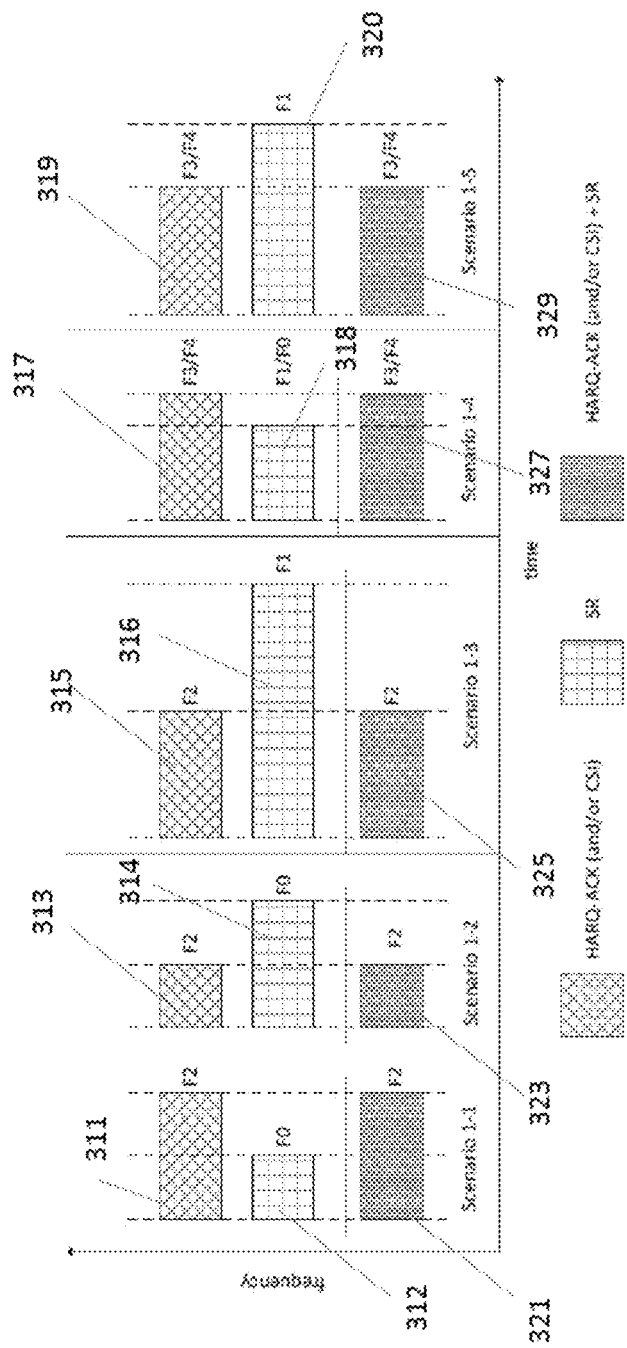

FIG. 3(a)-3(b) illustrate examples to multiplex overlapping PUCCH resources carrying uplink control information (UCI) in different formats in accordance with some embodiments. A first PUCCH resource may carry a payload containing a first UCI of a first size in a first format, and a second PUCCH resource may carry a payload containing a second UCI of a second size in a second format. The first PUCCH resource may partially overlap with the second PUCCH resource, as shown in FIG. 3(a). For example, the first PUCCH resource partially overlaps with the second PUCCH resource that the first PUCCH resource has a starting symbol different from a starting symbol of the second PUCCH resource, and further with a same or different durations. When the first PUCCH resource partially overlaps with the second PUCCH resource that the first PUCCH resource has a starting symbol different from a starting symbol of the second PUCCH resource, the first size of the payload in the first PUCCH resource is larger than the second size of the payload in the second PUCCH resource, the UE may multiplex the first UCI and the second UCI to be carried by the first PUCCH resource in the first format.

Additionally and alternatively, the first PUCCH resource may fully collide with the second PUCCH resource, as shown in FIG. 3(b). For example, the first PUCCH resource may fully collide with the second PUCCH resource that the first PUCCH resource and the second PUCCH resource have a same starting symbol.

Embodiments herein may be generally directed to handling overlapping of PUCCHs carrying different UCI types for NR. In particular, embodiments may be directed to handle overlapping of multiple PUCCHs: (1) overlapping of HARQ-ACK/SR and CSI PUCCHs with same starting symbol; or (2) overlapping of HARQ-ACK/SR and CSI PUCCHs with different starting symbols.

In embodiments, as shown in FIG. 3(a), a first PUCCH 301 and a second PUCCH 303 may partial overlap within a symbol 305 having a starting point 302 and an ending point 304. The first PUCCH 301 has a starting point that is earlier than the starting point 302, while the second PUCCH 303 has the starting point 302 as the starting point. The ending point 304 may be the end point of the first PUCCH 301. The first PUCCH 301 and the second PUCCH 303 may have different duration too. Certain mechanisms are defined to allow the UE to multiplex one or multiple UCI types into one PUCCH in order to ensure alignment between NR NodeB (gNB) and UE, as shown in FIGS. 3(c)-3(d).

In embodiments, as shown in FIG. 3(b), when a first PUCCH resource, which carries a first payload containing a first uplink control information (UCI) in a first format with a first size UCI type, fully collides with a second PUCCH carrying a second UCI type, i.e., the first PUCCH and the second PUCCH have same starting symbols and durations, UE would multiplex the first and second UCI types into one of the first and second PUCCHs.

In one example, for the scenario 1-1, when PUCCH 311 in format 2 carrying HARQ-ACK collides with PUCCH 312 in format 0 carrying SR, UE would append SR after HARQ-ACK information bit and carry HARQ-ACK/SR into the PUCCH 321 in format 2.

In one example, for the scenario 1-2, when PUCCH 313 in format 2 carrying HARQ-ACK collides with PUCCH 314 in format 0 carrying SR, UE would append SR after HARQ-ACK information bit and carry HARQ-ACK/SR into the PUCCH 323 in format 2.

In one example, for the scenario 1-3, when PUCCH 315 in format 2 carrying HARQ-ACK collides with PUCCH 316 in format 1 carrying SR, UE would append SR after HARQ-ACK information bit and carry HARQ-ACK/SR into the PUCCH 325 in format 2.

In one example, for the scenario 1-4, when PUCCH 317 in format 3 or format 4 carrying HARQ-ACK collides with PUCCH 318 in format 0 or format 1 carrying SR, UE would append SR after HARQ-ACK information bit and carry HARQ-ACK/SR into the PUCCH 327 in format 3 or format 4.

In one example, for the scenario 1-5, when PUCCH 319 in format 3 or format 4 carrying HARQ-ACK collides with PUCCH 320 in format 1 carrying SR, UE would append SR after HARQ-ACK information bit and carry HARQ-ACK/SR into the PUCCH 329 in format 3 or format 4.

Embodiments Directed to Handling Multiplexing of Multiple UCIs on a PUCCH in Case of Full or Partial Overlapping In embodiments, full overlapping of multiple PUCCHs carrying same or different UCI types can occur within a slot when the PUCCH resources configured for the transmission of multiple PUCCHs within a slot have the same starting symbol and same duration in time. Partial overlapping of multiple PUCCHs can occur when multiple PUCCH transmissions configured with different PUCCH resources occur within a slot and they have either of the following properties:

Same starting symbol but different durations for transmission.

Different starting symbols and

Same duration for transmission (with different end symbols).

Different durations of transmission (with same or different end symbol(s))

In case when PUCCH resource(s) configured with PUCCH format 2/3/4 for HARQ-ACK/SR and CSI transmissions overlap in time, the various overlapping scenarios that may occur are described as follows. In embodiments, the HARQ-ACK can be one for a PDSCH scheduled dynamically by PDCCH, say simply dynamic PDSCH henceforth, and in another case, one for a PDSCH scheduled in a semi-persistent manner which is transmitted periodically without being scheduled by PDCCH once activated, say simply semi-persistently scheduled (SPS) PDSCH henceforth. Also, HARQ-ACK for other cases can be included.

Embodiments directed to Multiplexing of HARQ-ACK/SR and CSI on a PUCCH resource in case of overlapping PUCCH resources having same starting symbol In embodiments, as shown in FIG. 3(b), a PUCCH transmission (with payload size of more than 2 UCI bits) configured with PUCCH format 2/3/4 for HARQ-ACK and/or CSI transmission(s) may overlap in time with an SR transmission semi-statically configured with PUCCH format 0/1, where the SR transmission may be configured with same starting symbol as the HARQ-ACK and/or CSI transmission, and may have same or different duration(s) in time. In this case, UE may transmit one PUCCH for a combined HARQ-ACK/SR and CSI bit(s) on the PUCCH resource configured for HARQ-ACK and/or CSI transmission(s).

In one example, a UE may transmit the combined HARQ-ACK/SR and CSI bit(s) using PUCCH format 2 or PUCCH format 3 or PUCCH format 4 resource that includes 1 Physical resource block (PRB).

In another example, a UE may transmit the combined HARQ-ACK/SR and CSI bit(s) using PUCCH format 2 or PUCCH format 3 that includes $M_{RB}^{PUCCH}$ PRBs, where $M_{RB,max}^{PUCCH} \geq M_{RB}^{PUCCH} > 1$ and $M_{RB,max}^{PUCCH} = 16$. In that case, UE may determine a number of PRBs $M_{RB,min}^{PUCCH}$ for the PUCCH transmission to be the minimum number of PRBs, that is smaller than or equal to $M_{RB}^{PUCCH}$ PRBs which may be provided by higher layer parameter PUCCH-F2-number-of-PRBs or PUCCH-F3-number-of-PRBs and may start from the first PRB from the set of number of PRBs {1, 2, . . . , 16} for PUCCH format 2 or from the set of number of PRBs {1-6, 8-10, 12, 15, 16} for PUCCH format 3.

In another example, a UE may transmit the combined HARQ-ACK/SR and CSI bit(s) using PUCCH format 2 or PUCCH format 3 that includes $M_{RB}^{PUCCH}$ PRBs, where $M_{RB,max}^{PUCCH} \geq M_{RB}^{PUCCH} > 1$ and $M_{RB,max}^{PUCCH} > 16$. In that case, UE may determine a number of PRBs $M_{RB,min}^{PUCCH}$ for the PUCCH transmission to be the minimum number of PRBs, that is smaller than or equal to $M_{RB}^{PUCCH}$ PRBs which may be provided by higher layer parameter PUCCH-F2-number-of-PRBs or PUCCH-F3-number-of-PRBs and may start from the first PRB from the set of number of PRBs {1, 2, . . . , $M_{RB,max}^{PUCCH}$} for PUCCH format 2 or from a set of number of PRBs ranging between 1 and $M_{RB,max}^{PUCCH}$, where each number within the set can be factorized into the form $2^i \cdot 3^j \cdot 5^k$, with i, j, k being integers, for PUCCH format 3.

In embodiments, CSI transmission occasion(s) from a UE may have the same starting symbol as a HARQ-ACK/SR transmission from the UE, where the HARQ-ACK information, if any, is in response to a PDSCH reception without a corresponding PDCCH. For a single PUCCH based CSI report, a PUCCH resource for CSI report may be determined from PUCCH resources configured by higher layer parameter pucch-CSI-ResourceList, and for the case of multiple transmission occasions of CSI reports with a same first symbol, a PUCCH resource may be determined from PUCCH resources configured by higher layer parameter multi-CSI-PUCCH-ResourceList to convey the CSI reports.

For example, if the UE is configured with J≤2 PUCCH format 2 resources, or with J≤2 format 3 resources or J≤2 format 4 resources, which are configured either by higher layer parameters multi-CSI-PUCCH-ResourceList, or by higher layer parameters pucch-CSI-ResourceList, and where the resources are indexed according to an ascending order for the product of a number of corresponding REs, modulation order, and configured code rate then In one option, the UE may use the PUCCH format 2 resource 0, or the PUCCH format 3 resource 0, or the PUCCH format 4 resource 0 if the total payload (i.e. total number of UCI bits) to be transmitted is less than the payload size capacity of the PUCCH format 2 resource 0, or the PUCCH format 3 resource 0 or the PUCCH format 4 resource 0 in accordance to the PUCCH format configured to the resource.

In another option, the UE may use the PUCCH format 2 resource j+1, or the PUCCH format 3 resource j+1, or the PUCCH format 4 resource j+1, if the total payload to be transmitted is greater than the capacity of the PUCCH format 2 resource j, or the PUCCH format 3 resource j, or the PUCCH format 4 resource j and less than or equal to the capacity of the PUCCH format 2 resource j+1, or the PUCCH format 3 resource j+1 or the PUCCH format 4 resource j+1, where 0≤j<J−1.

In another option, the UE may use the PUCCH format 2 resource J−1, or the PUCCH format 3 resource J−1, or PUCCH format 4 resource J−1 and the UE may select $N_{CSI}^{reported}$ CSI report(s) for transmission together with HARQ-ACK/SR (if any) in ascending order of pre-defined priority rule and drop certain CSI bit(s), if the total payload to be transmitted is greater than the capacity of the PUCCH format 2 resource J−1, or the PUCCH format 3 resource J−1 or the PUCCH format 4 resource J−1.

In embodiments, a UE may have HARQ-ACK information to transmit in response to a PDSCH reception with a corresponding PDCCH or in response to a PDCCH indicating SPS PDSCH release, and the UE may have multiple wideband/sub-band CSI reports to transmit in a PUCCH, and all the configured PUCCH resources for HARQ-ACK/SR and CSI report(s) transmission have the same starting symbol. In that case, the UE may first combine multiple PUCCH based wideband/sub-band CSI reports on a single multi-CSI PUCCH resource configured by higher layer parameters multi-CSI-PUCCH-ResourceList as mentioned above (if there are more than one PUCCH based wideband/sub-band CSI report(s) configured with the same starting symbol) and subsequently multiplex HARQ-ACK/SR and the combined wideband/sub-band CSI report on a PUCCH resource.

In one example, If a UE has HARQ-ACK information to transmit in response to a PDSCH reception with a corresponding PDCCH or in response to a PDCCH indicating SPS PDSCH release, and the UE has wideband CSI report(s) to transmit in a PUCCH, the UE may determine a PUCCH format 2 resource or a PUCCH format 3 resource or a PUCCH format 4 resource to transmit combined HARQ-ACK/SR and CSI bits.

In one option, UE may determine a PUCCH format 2 resource or a PUCCH format 3 resource or a PUCCH format 4 resource in the following way and some actions may be omitted in cases:

In the first action, the UE may combine multiple PUCCH based wideband CSI reports on a single multi-CSI PUCCH resource configured by higher layer parameters multi-CSI-PUCCH-ResourceList as mentioned in the embodiment above.

In the second action, UE may first determine a PUCCH resource set from the PUCCH resource configurations for HARQ-ACK transmission (which may be configured with more than one PUCCH resource sets) with higher layer parameter PUCCH-F2-simultaneous-HARQ-ACK-CSI=TRUE, or PUCCH-F3-simultaneous-HARQ-ACK-CSI=TRUE or PUCCH-F4-simultaneous-HARQ-ACK-CSI=TRUE, respectively, where the determination of PUCCH resource set can be based on the total payload size to be transmitted.

In the third action, a PUCCH resource within the determined PUCCH resource set may be determined based on the PUCCH resource indicator field in a last DCI (downlink control information) format 1_0 or DCI format 1_1 that the UE detects and for which UE transmits corresponding HARQ-ACK information in the PUCCH.

In the fourth action, UE may transmit combined HARQ-ACK/SR and wideband CSI report bits using the determined PUCCH format 2 resource or PUCCH format 3 resource or PUCCH format 4 resource and selecting minimum number of PRBs $M_{RB,min}^{PUCCH}$ as described in the above embodiment for PUCCH format 2 resource or PUCCH format 3 resource, while $M_{RB,min}^{PUCCH}=1$ for PUCCH format 4 resource.

In the fifth action, UE may select $N_{CSI}^{reported}$ CSI report(s) for transmission together with HARQ-ACK/SR in ascending order of pre-defined priority rule and drop certain CSI bit(s), if the total payload to be transmitted is greater than the capacity of the determined PUCCH format 2 resource or the PUCCH format 3 resource or the PUCCH format 4 resource.

The aforementioned procedure may apply if multiple PUCCH based wideband CSI reports are configured with the same starting symbol.

In another option, the UE may follow actions one to three as explained in the above example and in the fourth action, UE may transmit the combined HARQ-ACK/SR and wideband CSI report bits using the CSI PUCCH resource. This can be applied if the CSI PUCCH resource has higher payload carrying capacity than determined PUCCH format 2 resource or PUCCH format 3 resource or PUCCH format 4 resource configured for HARQ-ACK transmission. Similar to the fifth action in the above example, UE may select $N_{CSI}^{reported}$ CSI report(s) for transmission together with HARQ-ACK/SR in ascending order of pre-defined priority rule and drop certain CSI bit(s), if the total payload to be transmitted is greater than the capacity of the CSI PUCCH resource.

In another example, If a UE has HARQ-ACK information to transmit in response to a PDSCH reception with a corresponding PDCCH or in response to a PDCCH indicating SPS PDSCH release, and the UE has sub-band CSI report(s) to transmit in a PUCCH, the UE may determine a PUCCH format 3 resource or a PUCCH format 4 resource to transmit combined HARQ-ACK/SR and sub-band CSI bits.

In one option, UE may determine a PUCCH format 3 resource or a PUCCH format 4 resource in the following way and some action may be omitted in cases:

In the first action, the UE may combine multiple PUCCH based sub-band CSI reports on a single multi-CSI PUCCH resource configured by higher layer parameters multi-CSI-PUCCH-ResourceList as mentioned in the embodiment above, if multiple PUCCH based sub-band CSI reports are configured with the same starting symbol.

In the second action, UE may first determine a PUCCH resource set from the PUCCH resource configurations for HARQ-ACK transmission (which may be configured with more than one PUCCH resource sets) with higher layer parameter PUCCH-F3-simultaneous-HARQ-ACK-CSI=TRUE or PUCCH-F4-simultaneous-HARQ-ACK-CSI=TRUE, respectively, where the determination of PUCCH resource set can be based on the total payload size to be transmitted.

In the third action, a PUCCH resource within the determined PUCCH resource set is determined based on the PUCCH resource indicator field in a last DCI (downlink control information) format 1_0 or DCI format 1_1 that the UE detects and for which UE transmits corresponding HARQ-ACK information in the PUCCH.

In the fourth action, UE may transmit combined HARQ-ACK/SR and sub-band CSI report bits using the determined PUCCH format 3 resource or PUCCH format 4 resource and selecting minimum number of PRBs $M_{RB,min}^{PUCCH}$ as explained in the above embodiment for PUCCH format 3 resource, while $M_{RB,min}^{PUCCH}=1$ for PUCCH format 4 resource.

In the fifth action, UE may select $N_{CSI\text{-}part2}^{reported}$ CSI part 2 report(s) for transmission together with HARQ-ACK/SR and CSI part 1, in ascending order of pre-defined priority rule and drop certain CSI part 2 bit(s), if the total payload to be transmitted is greater than the capacity of the determined PUCCH format 3 resource or PUCCH format 4 resource.

In the sixth action, UE may drop all CSI part 2 report(s) and select $N_{CSI\text{-}part1}^{reported}$ CSI part 1 report(s) for transmission together with HARQ-ACK/SR, in ascending order of pre-defined priority rule and drop certain CSI part 1 bit(s), if the total payload of HARQ-ACK/SR and CSI part1 report(s) is greater than the capacity of the determined PUCCH format 3 resource or PUCCH format 4 resource.

In another option, the UE may follow actions one to three as explained in the above example and in the fourth action, UE may transmit combined HARQ-ACK/SR and sub-band CSI report bits using the CSI PUCCH resource. This can be applied if the CSI PUCCH resource has higher payload carrying capacity than determined PUCCH format 3 resource or PUCCH format 4 resource configured for HARQ-ACK transmission. Similar to fifth and sixth actions in the above example, UE may either select $N_{CSI\text{-}part2}^{reported}$ CSI part 2 report(s) for transmission together with HARQ-ACK/SR and CSI part 1 bits or, UE may drop all CSI part 2 report(s) and select $N_{CSI,part1}^{reported}$ CSI part 1 report(s) for transmission with HARQ-ACK/SR on the CSI PUCCH resource.

In embodiments, UE may assume the same starting symbol of the determined PUCCH resource based on PUCCH resource indicator field in a last DCI format 1_0 or DCI format 1_1 that the UE detects, from one or more PUCCH resource set(s). This indicates that regardless of total payload size, the same starting symbol of PUCCH resource from the PUCCH resource sets with the same PUCCH resource indicator can be expected for a given UE.

To achieve this, PUCCH resource partition may be considered for one or more PUCCH resource set(s). Up to 32 PUCCH resources can be configured for a PUCCH resource set with UCI payload size less than 3 bits, and 8 PUCCH resources can be configured for a PUCCH resource set with UCI payload size greater than 2 bits. In particular, for up to 2 UCI bits, a combination of explicit indication (PUCCH resource indicator) and implicit derivation (e.g., based on starting control channel element (CCE) and aggregation level (AL)) can be jointly used to determine the PUCCH resource. For this case, the PUCCH resource indicator may point to a PUCCH resource sub-set from a PUCCH resource set. This indicates that the same starting symbol may be configured for a PUCCH resource sub-set for up to 2 UCI bits and PUCCH resource for greater than 2 UCI bits when the same PUCCH resource indicator is applied.

Embodiments Directed to Multiplexing of HARQ-ACK/SR and CSI on a PUCCH resource in case of overlapping PUCCH resources having different starting symbols Embodiments herein may include examples with large payloads carried by various formats, where a large payload is carried by formats 3/4 (long PUCCH), or carried by format 2 (short PUCCH). In addition, a small payload may be carried either by a short PUCCH (format 0) or a long PUCCH (format 1). If the two colliding PUCCHs are combined, the combined payload may be carried using the PUCCH format that has larger payload carrying capacity (i.e. PUCCH formats 2/3/4).

In embodiments, CSI transmission occasion(s) from a UE may have different starting symbol(s) than HARQ-ACK/SR transmission, where the HARQ-ACK information, if any, may be in response to a PDSCH reception without a corresponding PDCCH.

In one example, a UE may be configured with J≤2 PUCCH format 2 resources, or with J≤2 format 3 resources or J≤2 format 4 resources with different starting symbols. Then, UE may either choose a PUCCH resource with the earliest starting symbol (if there is only one PUCCH resource with an earliest starting symbol) or the UE may choose a PUCCH resource amongst more than one PUCCH resources with the same earliest starting symbol following the similar embodiment mentioned above of multiplexing multiple CSI reports and HARQ-ACK (if any) on one multi-CSI PUCCH resource.

In embodiments, a UE may have HARQ-ACK information to transmit in response to a PDSCH reception with a corresponding PDCCH or in response to a PDCCH indicating SPS PDSCH release, and the UE may have multiple wideband/sub-band CSI reports to transmit in a PUCCH, where the configured PUCCH resources for HARQ-ACK/SR and CSI report(s) transmission may have different starting symbols. In that case, the UE may first combine multiple PUCCH based wideband/sub-band CSI reports on a single multi-CSI PUCCH resource as mentioned in the above embodiment and subsequently multiplex HARQ-ACK/SR and the combined wideband/sub-band CSI report on a PUCCH resource.

In one example, If a UE has HARQ-ACK information to transmit in response to a PDSCH reception with a corresponding PDCCH or in response to a PDCCH indicating SPS PDSCH release, and the UE has wideband CSI report(s) to transmit in a PUCCH, where the configured PUCCH resources for HARQ-ACK and wideband CSI report(s) have different starting symbols, UE may choose to transmit HARQ-ACK/SR and drop CSI, if HARQ-ACK/SR is configured with PUCCH resource having earlier starting symbol than CSI PUCCH-based resource. In addition, UE may choose to transmit CSI and drop HARQ-ACK/SR or transmit CSI and HARQ-ACK/SR on a PUCCH resource, if CSI PUCCH-based resource has earlier starting symbol than configured PUCCH resource for HARQ-ACK/SR.

In another example, If a UE has HARQ-ACK information to transmit in response to a PDSCH reception with a corresponding PDCCH or in response to a PDCCH indicating SPS PDSCH release, and the UE has sub-band CSI report(s) to transmit in a PUCCH, where the configured PUCCH resources for HARQ-ACK and sub-band CSI report(s) have different starting symbols, UE may choose to transmit HARQ-ACK/SR and drop CSI, if HARQ-ACK/SR is configured with PUCCH resource having earlier starting symbol than CSI PUCCH-based resource or transmit CSI and HARQ-ACK/SR on a PUCCH resource. In addition, UE may choose to transmit CSI and drop HARQ-ACK/SR, if CSI PUCCH-based resource has earlier starting symbol than configured PUCCH resource for HARQ-ACK/SR.

In embodiments, If a UE has HARQ-ACK information to transmit in response to a PDSCH reception with a corresponding PDCCH or in response to a PDCCH indicating SPS PDSCH release, and the UE has sub-band CSI report(s) to transmit in a PUCCH, where the configured PUCCH resources for HARQ-ACK and wideband/sub-band CSI report(s) have different starting symbols, the UE may first combine multiple PUCCH based wideband/sub-band CSI reports on a single multi-CSI PUCCH resource as mentioned in the above embodiment and subsequently determine the total payload size of combined CSI report and HARQ-ACK/SR. Based on the determined total payload size, UE may determine a PUCCH resource set from multiple PUCCH resource sets, and then determine a PUCCH resource from the determined PUCCH resource set in accordance with PUCCH resource indicator field in a last DCI format 1_0 or DCI format 1_1 that the UE detects.

If the starting symbol of the determined PUCCH resource is earlier than CSI PUCCH resource as determined above, in one option, UE may drop CSI and transmit HARQ-ACK/SR in accordance with the HARQ-ACK/SR payload size and PUCCH resource indicator field in a last DCI format 1_0 or DCI format 1_1 that the UE detects.

Yet in another option, UE may combine CSI report and HARQ-ACK/SR and transmit the combined UCI on the determined PUCCH resource.

If the starting symbol of the determined PUCCH resource is later than CSI PUCCH resource as determined above, UE may drop HARQ-ACK/SR and transmit CSI report only on the determined CSI PUCCH resource. Alternatively, UE may drop CSI report and transmit HARQ-ACK/SR in accordance with the HARQ-ACK/SR payload size and PUCCH resource indicator field in a last DCI format 1_0 or DCI format 1_1 that the UE detects.

In embodiments, a reference payload size of CSI part 2 can be used to determine the total payload size for multiple CSI reports or a combined CSI and HARQ-ACK/SR. In addition, the reference payload size of CSI part 2 can be used to determine the minimum number of PRBs when PUCCH format 3 is employed. The reference payload size of the CSI part 2 may be determined assuming rank 1 transmission or the maximum rank which is configured for a given UE.

Alternatively, the reference payload size may be determined based on the minimum or maximum payload size of CSI part 2 depending on the CSI configuration.

Figure 4A:
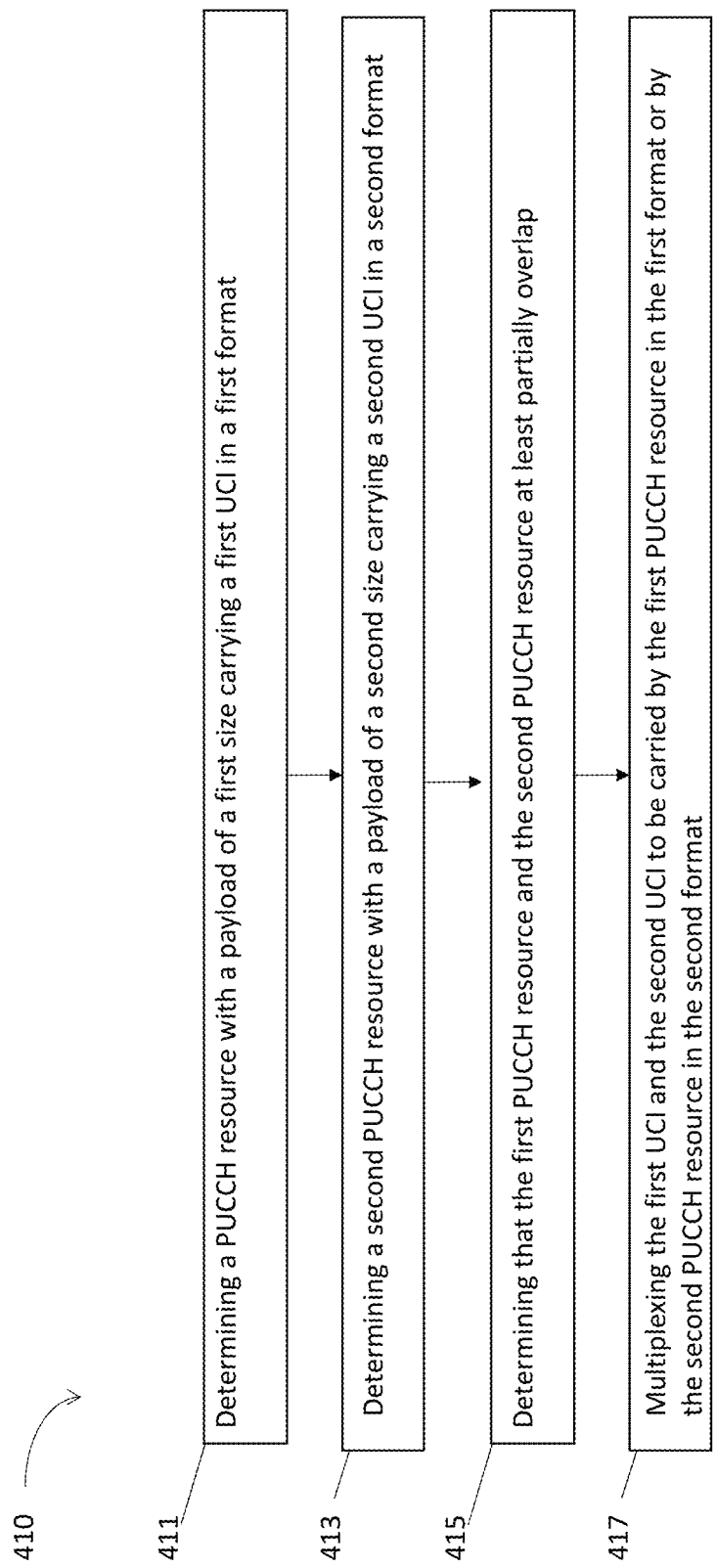
FIGS. 4(*a*)-4(*b*) illustrate operation flows/algorithmic structures to multiplex overlapping PUCCH resources carrying uplink control information (UCI) in different formats in accordance with some embodiments.
Figure 4B:
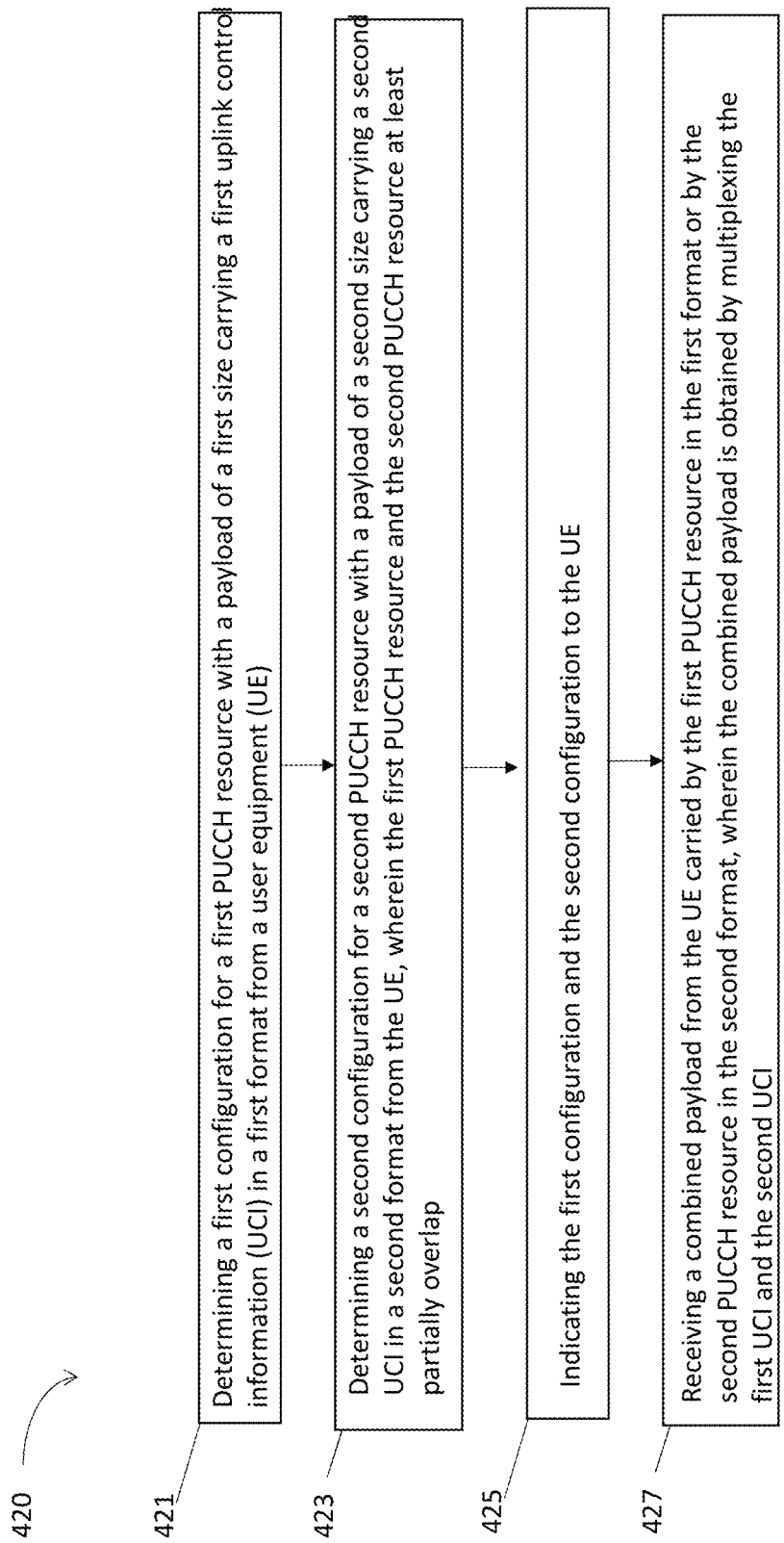

FIGS. 4(a)-4(b) illustrate operation flows/algorithmic structures to multiplex overlapping PUCCH resources carrying uplink control information (UCI) in different formats in accordance with some embodiments. In particular, FIG. 4(a) illustrates an operation flow/algorithmic structure 410 that may be implemented by a UE, e.g., the UE 104, or components thereof, as described herein with respect to any one of FIG. 1, or FIGS. 5-13. FIG. 4(b) illustrates operation flows/algorithmic structures 420 for a base station, e.g., the base station 108, or components thereof, as described herein with respect to any one of FIG. 1, or FIGS. 5-13.

The operation flow/algorithmic structure 410 may include, at 411, determining a first physical uplink control channel (PUCCH) resource with a payload of a first size carrying a first uplink control information (UCI) in a first format; at 413, determining a second PUCCH resource with a payload of a second size carrying a second UCI in a second format; at 415, determining that the first PUCCH resource and the second PUCCH resource at least partially overlap; and at 417, multiplexing the first UCI and the second UCI to be carried by the first PUCCH resource in the first format or by the second PUCCH resource in the second format. The operations of the operation flow/algorithmic structure 410 may be carried out by a processing circuitry of a UE, e.g., the processing circuitry 102 of the UE 104, application circuitry 705 or 805, or baseband circuitry 710 or 810.

The operation flow/algorithmic structure 420 may include, at 421, determining a first configuration for a first physical uplink control channel (PUCCH) resource with a payload of a first size carrying a first uplink control information (UCI) in a first format from a user equipment (UE); at 423, determining a second configuration for a second PUCCH resource with a payload of a second size carrying a second UCI in a second format from the UE, wherein the first PUCCH resource and the second PUCCH resource at least partially overlap; at 415, indicating the first configuration and the second configuration to the UE; and at 417, receiving a combined payload from the UE carried by the first PUCCH resource in the first format or by the second PUCCH resource in the second format, wherein the combined payload is obtained by multiplexing the first UCI and the second UCI. The operations of the operation flow/algorithmic structure 420 may be carried out by a processing circuitry of a base station, e.g., application circuitry 705 or 805, or baseband circuitry 710 or 810; radio frontend module 715 or 815, or network controller circuitry 735, or antenna 920, as shown in FIGS. 1, and 5-13.

Figure 5:
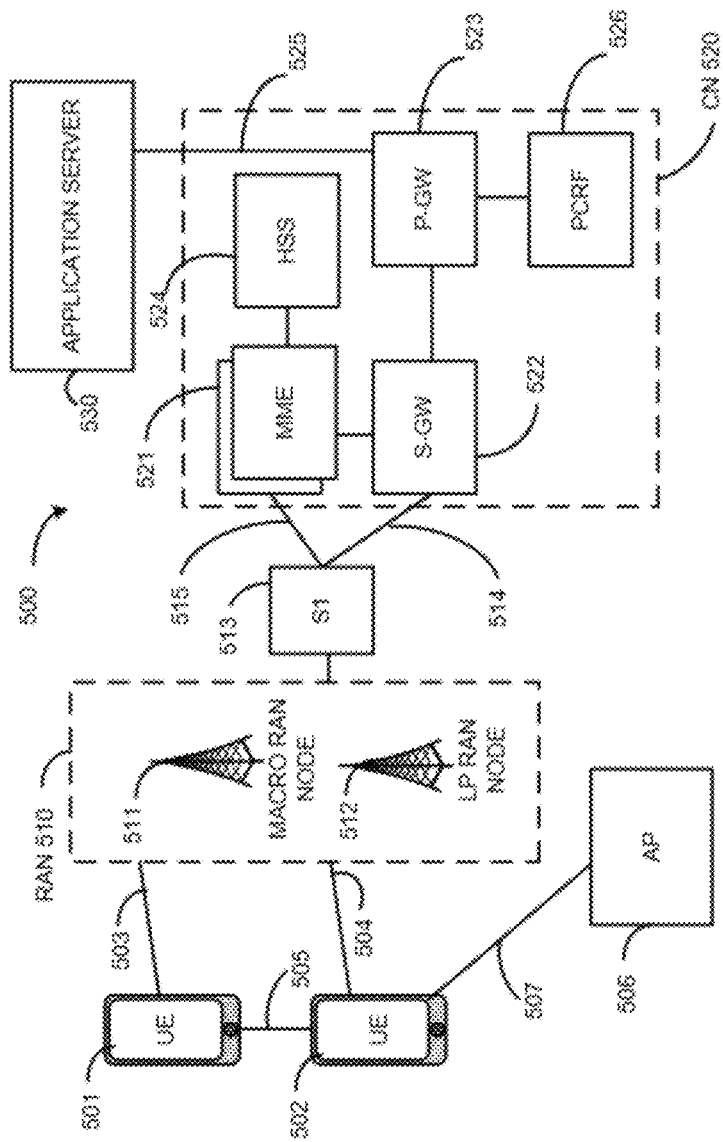
FIG. 5 illustrates an architecture of a system of a network in accordance with some embodiments.

FIG. 5 illustrates an architecture of a system 500 of a network in accordance with some embodiments. The system 500 is shown to include a user equipment (UE) 501 and a UE 502. As used herein, the term "user equipment" or "UE" may refer to a device with radio communication capabilities and may describe a remote user of network resources in a communications network. The term "user equipment" or "UE" may be considered synonymous to, and may be referred to as client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface. In this example, UEs 501 and 502 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, machine-type communications (MTC) devices, machine-to-machine (M2M), Internet of Things (IoT) devices, and/or the like.

In some embodiments, any of the UEs 501 and 502 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 501 and 502 may be configured to connect, e.g., communicatively couple, with a radio access network (RAN) 510—the RAN 510 may be, for example, an Evolved Universal Mobile Telecommunications System (UMTS) Terrestrial Radio Access Network (E-UTRAN), a NextGen RAN (NG RAN), or some other type of RAN. The UEs 501 and 502 utilize connections (or channels) 503 and 504, respectively, each of which comprises a physical communications interface or layer (discussed in further detail infra). As used herein, the term "channel" may refer to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" may refer to a connection between two devices through a Radio Access Technology (RAT) for the purpose of transmitting and receiving information. In this example, the connections 503 and 504 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 501 and 502 may further directly exchange communication data via a ProSe interface 505. The ProSe interface 505 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH). In various implementations, the SL interface 505 may be used in vehicular applications and communications technologies, which are often referred to as V2X systems. V2X is a mode of communication where UEs (for example, UEs 501, 502) communicate with each other directly over the PC5/SL interface 505 and can take place when the UEs 501, 502 are served by RAN nodes 511, 512 or when one or more UEs are outside a coverage area of the RAN 510. V2X may be classified into four different types: vehicle-to-vehicle (V2V), vehicle-to-infrastructure (V2I), vehicle-to-network (V2N), and vehicle-to-pedestrian (V2P). These V2X applications can use "co-operative awareness" to provide more intelligent services for end-users. For example, vUEs 501, 502, RAN nodes 511, 512, application servers 530, and pedestrian UEs 501, 502 may collect knowledge of their local environment (for example, information received from other vehicles or sensor equipment in proximity) to process and share that knowledge in order to provide more intelligent services, such as cooperative collision warning, autonomous driving, and the like. In these implementations, the UEs 501, 502 may be implemented/employed as Vehicle Embedded Communications Systems (VECS) or vUEs.

The UE 502 is shown to be configured to access an access point (AP) 506 (also referred to as also referred to as "WLAN node 506", "WLAN 506", "WLAN Termination 506" or "WT 506" or the like) via connection 507. The connection 507 can comprise a local wireless connection, such as a connection consistent with any IEEE 802.11 protocol, wherein the AP 506 would comprise a wireless fidelity (WiFi®) router. In this example, the AP 506 is shown to be connected to the Internet without connecting to the core network of the wireless system (described in further detail below). In various embodiments, the UE 502, RAN 510, and AP 506 may be configured to utilize LTE-WLAN aggregation (LWA) operation and/or WLAN LTE/WLAN Radio Level Integration with IPsec Tunnel (LWIP) operation. The LWA operation may involve the UE 502 in RRC_CONNECTED being configured by a RAN node 511, 512 to utilize radio resources of LTE and WLAN. LWIP operation may involve the UE 502 using WLAN radio resources (e.g., connection 507) via Internet Protocol Security (IPsec) protocol tunneling to authenticate and encrypt packets (e.g., internet protocol (IP) packets) sent over the connection 507. IPsec tunneling may include encapsulating entirety of original IP packets and adding a new packet header thereby protecting the original header of the IP packets.

The RAN 510 can include one or more access nodes that enable the connections 503 and 504. As used herein, the terms "access node," "access point," or the like may describe equipment that provides the radio baseband functions for data and/or voice connectivity between a network and one or more users. These access nodes can be referred to as base stations (BS), NodeBs, evolved NodeBs (eNBs), next Generation NodeBs (gNB), RAN nodes, Road Side Units (RSUs), and so forth, and can comprise ground stations (e.g., terrestrial access points) or satellite stations providing coverage within a geographic area (e.g., a cell). The term "Road Side Unit" or "RSU" may refer to any transportation infrastructure entity implemented in or by an gNB/eNB/RAN node or a stationary (or relatively stationary) UE, where an RSU implemented in or by a UE may be referred to as a "UE-type RSU", an RSU implemented in or by an eNB may be referred to as an "eNB-type RSU." The RAN 510 may include one or more RAN nodes for providing macrocells, e.g., macro RAN node 511, and one or more RAN nodes for providing femtocells or picocells (e.g., cells having smaller coverage areas, smaller user capacity, or higher bandwidth compared to macrocells), e.g., low power (LP) RAN node 512.

Any of the RAN nodes 511 and 512 can terminate the air interface protocol and can be the first point of contact for the UEs 501 and 502. In some embodiments, any of the RAN nodes 511 and 512 can fulfill various logical functions for the RAN 510 including, but not limited to, radio network controller (RNC) functions such as radio bearer management, uplink and downlink dynamic radio resource management, and data packet scheduling, and mobility management.

In accordance with some embodiments, the UEs 501 and 502 can be configured to communicate using Orthogonal Frequency-Division Multiplexing (OFDM) communication signals with each other or with any of the RAN nodes 511 and 512 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 511 and 512 to the UEs 501 and 502, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 501 and 502. The physical downlink control channel (PDCCH) may carry information about the transport format and resource allocations related to the PDSCH channel, among other things. It may also inform the UEs 501 and 502 about the transport format, resource allocation, and H-ARQ (Hybrid Automatic Repeat Request) information related to the uplink shared channel. Typically, downlink scheduling (assigning control and shared channel resource blocks to the UE 502 within a cell) may be performed at any of the RAN nodes 511 and 512 based on channel quality information fed back from any of the UEs 501 and 502. The downlink resource assignment information may be sent on the PDCCH used for (e.g., assigned to) each of the UEs 501 and 502.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 510 is shown to be communicatively coupled to a core network (CN) 520—via an S1 interface 513. In embodiments, the CN 520 may be an evolved packet core (EPC) network, a NextGen Packet Core (NPC) network, or some other type of CN. In this embodiment the S1 interface 513 is split into two parts: the S1-U interface 514, which carries traffic data between the RAN nodes 511 and 512 and the serving gateway (S-GW) 522, and the S1-mobility management entity (MME) interface 515, which is a signaling interface between the RAN nodes 511 and 512 and MMES 521.

In this embodiment, the CN 520 comprises the MMES 521, the S-GW 522, the Packet Data Network (PDN) Gateway (P-GW) 523, and a home subscriber server (HSS) 524. The MMES 521 may be similar in function to the control plane of legacy Serving General Packet Radio Service (GPRS) Support Nodes (SGSN). The MMEs 521 may manage mobility aspects in access such as gateway selection and tracking area list management. The HSS 524 may comprise a database for network users, including subscription-related information to support the network entities' handling of communication sessions. The CN 520 may comprise one or several HSSs 524, depending on the number of mobile subscribers, on the capacity of the equipment, on the organization of the network, etc. For example, the HSS 524 can provide support for routing/roaming, authentication, authorization, naming/addressing resolution, location dependencies, etc.

The S-GW 522 may terminate the S1 interface 513 towards the RAN 510, and routes data packets between the RAN 510 and the CN 520. In addition, the S-GW 522 may be a local mobility anchor point for inter-RAN node handovers and also may provide an anchor for inter-3GPP mobility. Other responsibilities may include lawful intercept, charging, and some policy enforcement.

The P-GW 523 may terminate an SGi interface toward a PDN. The P-GW 523 may route data packets between the EPC network 523 and external networks such as a network including the application server 530 (alternatively referred to as application function (AF)) via an Internet Protocol (IP) interface 525. Generally, the application server 530 may be an element offering applications that use IP bearer resources with the core network (e.g., UMTS Packet Services (PS) domain, LTE PS data services, etc.). In this embodiment, the P-GW 523 is shown to be communicatively coupled to an application server 530 via an IP communications interface 525. The application server 530 can also be configured to support one or more communication services (e.g., Voice-over-Internet Protocol (VoIP) sessions, PTT sessions, group communication sessions, social networking services, etc.) for the UEs 501 and 502 via the CN 520.

The P-GW 523 may further be a node for policy enforcement and charging data collection. Policy and Charging Enforcement Function (PCRF) 526 is the policy and charging control element of the CN 520. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 526 may be communicatively coupled to the application server 530 via the P-GW 523. The application server 530 may signal the PCRF 526 to indicate a new service flow and select the appropriate Quality of Service (QoS) and charging parameters. The PCRF 526 may provision this rule into a Policy and Charging Enforcement Function (PCEF) (not shown) with the appropriate traffic flow template (TFT) and QoS class of identifier (QCI), which commences the QoS and charging as specified by the application server 530.

Figure 6:
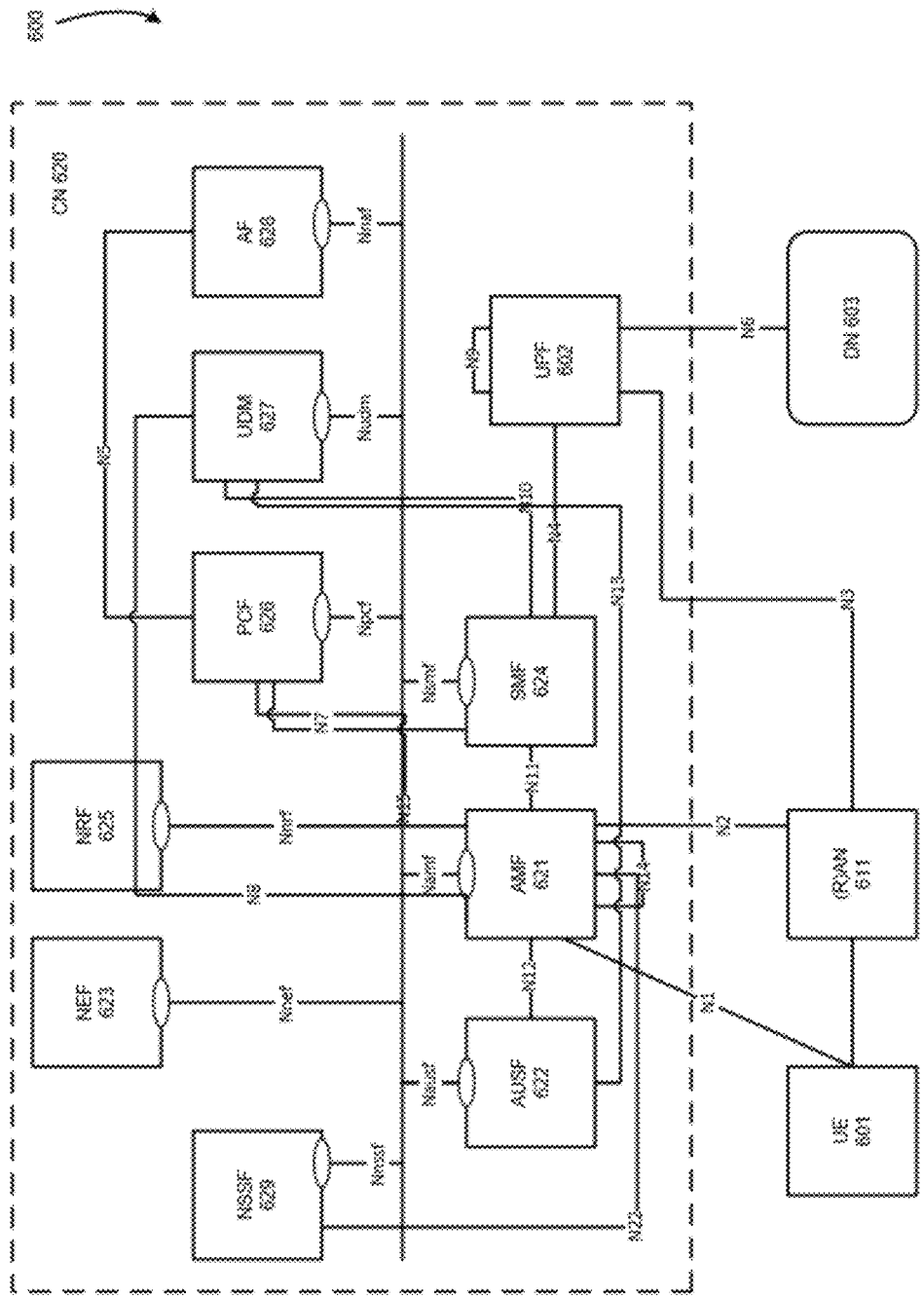
FIG. 6 illustrates an architecture of a system of a network in accordance with some embodiments.

FIG. 6 illustrates an architecture of a system 600 of a network in accordance with some embodiments. The system 600 is shown to include a UE 601, which may be the same or similar to UEs 501 and 502 discussed previously; a RAN node 611, which may be the same or similar to RAN nodes 511 and 512 discussed previously; a Data network (DN) 603, which may be, for example, operator services, Internet access or 3rd party services; and a 5G Core Network (5GC or CN) 620.

The CN 620 may include an Authentication Server Function (AUSF) 622; an Access and Mobility Management Function (AMF) 621; a Session Management Function (SMF) 624; a Network Exposure Function (NEF) 623; a Policy Control function (PCF) 626; a Network Function (NF) Repository Function (NRF) 625; a Unified Data Management (UDM) 627; an Application Function (AF) 628; a User Plane Function (UPF) 602; and a Network Slice Selection Function (NSSF) 629.

The UPF 602 may act as an anchor point for intra-RAT and inter-RAT mobility, an external PDU session point of interconnect to DN 603, and a branching point to support multi-homed PDU session. The UPF 602 may also perform packet routing and forwarding, packet inspection, enforce user plane part of policy rules, lawfully intercept packets (UP collection); traffic usage reporting, perform QoS handling for user plane (e.g. packet filtering, gating, UL/DL rate enforcement), perform Uplink Traffic verification (e.g., SDF to QoS flow mapping), transport level packet marking in the uplink and downlink, and downlink packet buffering and downlink data notification triggering. UPF 602 may include an uplink classifier to support routing traffic flows to a data network. The DN 603 may represent various network operator services, Internet access, or third party services. NY 603 may include, or be similar to application server 930 discussed previously. The UPF 602 may interact with the SMF 624 via an N4 reference point between the SMF 624 and the UPF 602.

The AUSF 622 may store data for authentication of UE 601 and handle authentication related functionality. The AUSF 622 may facilitate a common authentication framework for various access types. The AUSF 622 may communicate with the AMF 621 via an N12 reference point between the AMF 621 and the AUSF 622; and may communicate with the UDM 627 via an N13 reference point between the UDM 627 and the AUSF 622. Additionally, the AUSF 622 may exhibit an Nausf service-based interface.

The AMF 621 may be responsible for registration management (e.g., for registering UE 601, etc.), connection management, reachability management, mobility management, and lawful interception of AMF-related events, and access authentication and authorization. The AMF 621 may be a termination point for the an N11 reference point between the AMF 621 and the SMF 624. The AMF 621 may provide transport for Session Management (SM) messages between the UE 601 and the SMF 624, and act as a transparent proxy for routing SM messages. AMF 621 may also provide transport for short message service (SMS) messages between UE 601 and an SMS function (SMSF) (not shown by FIG. 6). AMF 621 may act as Security Anchor Function (SEA), which may include interaction with the AUSF 622 and the UE 601, receipt of an intermediate key that was established as a result of the UE 601 authentication process. Where USIM based authentication is used, the AMF 621 may retrieve the security material from the AUSF 622. AMF 621 may also include a Security Context Management (SCM) function, which receives a key from the SEA that it uses to derive access-network specific keys. Furthermore, AMF 621 may be a termination point of RAN CP interface, which may include or be an N2 reference point between the (R)AN 611 and the AMF 621; and the AMF 621 may be a termination point of NAS (N1) signalling, and perform NAS ciphering and integrity protection.

AMF 621 may also support NAS signalling with a UE 601 over an N3 interworking-function (IWF) interface. The N3IWF may be used to provide access to untrusted entities. N3IWF may be a termination point for the N2 interface between the (R)AN 611 and the AMF 621 for the control plane, and may be a termination point for the N3 reference point between the (R)AN 611 and the UPF 602 for the user plane. As such, the AMF 621 may handle N2 signalling from the SMF 624 and the AMF 621 for PDU sessions and QoS, encapsulate/de-encapsulate packets for IPSec and N3 tunnelling, mark N3 user-plane packets in the uplink, and enforce QoS corresponding to N3 packet marking taking into account QoS requirements associated to such marking received over N2. N3IWF may also relay uplink and downlink control-plane NAS signalling between the UE 601 and AMF 621 via an N1 reference point between the UE 601 and the AMF 621, and relay uplink and downlink user-plane packets between the UE 601 and UPF 602. The N3IWF also provides mechanisms for IPsec tunnel establishment with the UE 601. The AMF 621 may exhibit an Namf service-based interface, and may be a termination point for an N14 reference point between two AMFs 621 and an N17 reference point between the AMF 621 and a 5G-Equipment Identity Register (5G-EIR) (not shown by FIG. 6).

The SMF 624 may be responsible for session management (e.g., session establishment, modify and release, including tunnel maintain between UPF and AN node); UE IP address allocation & management (including optional Authorization); Selection and control of UP function; Configures traffic steering at UPF to route traffic to proper destination; termination of interfaces towards Policy control functions; control part of policy enforcement and QoS; lawful intercept (for SM events and interface to LI System); termination of SM parts of NAS messages; downlink Data Notification; initiator of AN specific SM information, sent via AMF over N2 to AN; determine SSC mode of a session. The SMF 624 may include the following roaming functionality: handle local enforcement to apply QoS SLAB (VPLMN); charging data collection and charging interface (VPLMN); lawful intercept (in VPLMN for SM events and interface to LI System); support for interaction with external DN for transport of signalling for PDU session authorization/authentication by external DN. An N16 reference point between two SMFs 624 may be included in the system 600, which may be between another SMF 624 in a visited network and the SMF 624 in the home network in roaming scenarios. Additionally, the SMF 624 may exhibit the Nsmf service-based interface.

The NEF 623 may provide means for securely exposing the services and capabilities provided by 3GPP network functions for third party, internal exposure/re-exposure, Application Functions (e.g., AF 628), edge computing or fog computing systems, etc. In such embodiments, the NEF 623 may authenticate, authorize, and/or throttle the AFs. NEF 623 may also translate information exchanged with the AF 628 and information exchanged with internal network functions. For example, the NEF 623 may translate between an AF-Service-Identifier and an internal 5GC information. NEF 623 may also receive information from other network functions (NFs) based on exposed capabilities of other network functions. This information may be stored at the NEF 623 as structured data, or at a data storage NF using a standardized interfaces. The stored information can then be re-exposed by the NEF 623 to other NFs and AFs, and/or used for other purposes such as analytics. Additionally, the NEF 623 may exhibit an Nnef service-based interface.

The NRF 625 may support service discovery functions, receive NF Discovery Requests from NF instances, and provide the information of the discovered NF instances to the NF instances. NRF 625 also maintains information of available NF instances and their supported services. As used herein, the terms "instantiate", "instantiation", and the like may refer to the creation of an instance, and an "instance" may refer to a concrete occurrence of an object, which may occur, for example, during execution of program code. Additionally, the NRF 625 may exhibit the Nnrf service-based interface.

The PCF 626 may provide policy rules to control plane function(s) to enforce them, and may also support unified policy framework to govern network behaviour. The PCF 626 may also implement a front end (FE) to access subscription information relevant for policy decisions in a UDR of the UDM 627. The PCF 626 may communicate with the AMF 621 via an N15 reference point between the PCF 626 and the AMF 621, which may include a PCF 626 in a visited network and the AMF 621 in case of roaming scenarios. The PCF 626 may communicate with the AF 628 via an N5 reference point between the PCF 626 and the AF 628; and with the SMF 624 via an N7 reference point between the PCF 626 and the SMF 624. The system 600 and/or CN 620 may also include an N24 reference point between the PCF 626 (in the home network) and a PCF 626 in a visited network. Additionally, the PCF 626 may exhibit an Npcf service-based interface.

The UDM 627 may handle subscription-related information to support the network entities' handling of communication sessions, and may store subscription data of UE 601. For example, subscription data may be communicated between the UDM 627 and the AMF 621 via an N8 reference point between the UDM 627 and the AMF 621 (not shown by FIG. 6). The UDM 627 may include two parts, an application FE and a User Data Repository (UDR) (the FE and UDR are not shown by FIG. 6). The UDR may store subscription data and policy data for the UDM 627 and the PCF 626, and/or structured data for exposure and application data (including Packet Flow Descriptions (PFDs) for application detection, application request information for multiple UEs 601) for the NEF 623. The Nudr service-based interface may be exhibited by the UDR 621 to allow the UDM 627, PCF 626, and NEF 623 to access a particular set of the stored data, as well as to read, update (e.g., add, modify), delete, and subscribe to notification of relevant data changes in the UDR. The UDM may include a UDM FE, which is in charge of processing of credentials, location management, subscription management and so on. Several different front ends may serve the same user in different transactions. The UDM-FE accesses subscription information stored in the UDR and performs authentication credential processing; user identification handling; access authorization; registration/mobility management; and subscription management. The UDR may interact with the SMF 624 via an N10 reference point between the UDM 627 and the SMF 624. UDM 627 may also support SMS management, wherein an SMS-FE implements the similar application logic as discussed previously. Additionally, the UDM 627 may exhibit the Nudm service-based interface.

The AF 628 may provide application influence on traffic routing, access to the Network Capability Exposure (NCE), and interact with the policy framework for policy control. The NCE may be a mechanism that allows the 5GC and AF 628 to provide information to each other via NEF 623, which may be used for edge computing implementations. In such implementations, the network operator and third party services may be hosted close to the UE 601 access point of attachment to achieve an efficient service delivery through the reduced end-to-end latency and load on the transport network. For edge computing implementations, the 5GC may select a UPF 602 close to the UE 601 and execute traffic steering from the UPF 602 to DN 603 via the N6 interface. This may be based on the UE subscription data, UE location, and information provided by the AF 628. In this way, the AF 628 may influence UPF (re)selection and traffic routing. Based on operator deployment, when AF 628 is considered to be a trusted entity, the network operator may permit AF 628 to interact directly with relevant NFs. Additionally, the AF 628 may exhibit an Naf service-based interface.

The NSSF 629 may select a set of network slice instances serving the UE 601. The NSSF 629 may also determine allowed Network Slice Selection Assistance Information (NSSAI) and the mapping to the Subscribed Single-NSSAIs (S-NSSAIs), if needed. The NSSF 629 may also determine the AMF set to be used to serve the UE 601, or a list of candidate AMF(s) 621 based on a suitable configuration and possibly by querying the NRF 625. The selection of a set of network slice instances for the UE 601 may be triggered by the AMF 621 with which the UE 601 is registered by interacting with the NSSF 629, which may lead to a change of AMF 621. The NSSF 629 may interact with the AMF 621 via an N22 reference point between AMF 621 and NSSF 629; and may communicate with another NSSF 629 in a visited network via an N31 reference point (not shown by FIG. 6). Additionally, the NSSF 629 may exhibit an Nnssf service-based interface.

As discussed previously, the CN 620 may include an SMSF, which may be responsible for SMS subscription checking and verification, and relaying SM messages to/from the UE 601 to/from other entities, such as an SMS-GMSC/IWMSC/SMS-router. The SMS may also interact with AMF 621 and UDM 627 for notification procedure that the UE 601 is available for SMS transfer (e.g., set a UE not reachable flag, and notifying UDM 627 when UE 601 is available for SMS).

The CN 620 may also include other elements that are not shown by FIG. 6, such as a Data Storage system/architecture, a 5G-Equipment Identity Register (5G-EIR), a Security Edge Protection Proxy (SEPP), and the like. The Data Storage system may include a Structured Data Storage network function (SDSF), an Unstructured Data Storage network function (UDSF), and/or the like. Any NF may store and retrieve unstructured data into/from the UDSF (e.g., UE contexts), via N18 reference point between any NF and the UDSF (not shown by FIG. 6). Individual NFs may share a UDSF for storing their respective unstructured data or individual NFs may each have their own UDSF located at or near the individual NFs. Additionally, the UDSF may exhibit an Nudsf service-based interface (not shown by FIG. 6). The 5G-EIR may be an NF that checks the status of Permanent Equipment Identifiers (PEI) for determining whether particular equipment/entities are blacklisted from the network; and the SEPP may be a non-transparent proxy that performs topology hiding, message filtering, and policing on inter-PLMN control plane interfaces.

Additionally, there may be many more reference points and/or service-based interfaces between the NF services in the NFs; however, these interfaces and reference points have been omitted from FIG. 6 for clarity. In one example, the CN 620 may include an Nx interface, which is an inter-CN interface between the MME (e.g., MME 521) and the AMF 621 in order to enable interworking between CN 620 and CN 520. Other example interfaces/reference points may include an N5g-eir service-based interface exhibited by a 5G-EIR, an N27 reference point between NRF in the visited network and the NRF in the home network; and an N31 reference point between the NSSF in the visited network and the NSSF in the home network.

In yet another example, system 600 may include multiple RAN nodes 611 wherein an Xn interface is defined between two or more RAN nodes 611 (e.g., gNBs and the like) that connecting to 5GC 620, between a RAN node 611 (e.g., gNB) connecting to 5GC 620 and an eNB (e.g., a RAN node 511 of FIG. 5), and/or between two eNBs connecting to 5GC 620. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 601 in a connected mode (e.g., CM-CONNECTED) including functionality to manage the UE mobility for connected mode between one or more RAN nodes 611. The mobility support may include context transfer from an old (source) serving RAN node 611 to new (target) serving RAN node 611; and control of user plane tunnels between old (source) serving RAN node 611 to new (target) serving RAN node 611. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on an SCTP layer. The SCTP layer may be on top of an IP layer. The SCTP layer provides the guaranteed delivery of application layer messages. In the transport IP layer point-to-point transmission is used to deliver the signaling PDUs. In other implementations, the Xn-U protocol stack and/or the Xn-C protocol stack may be same or similar to the user plane and/or control plane protocol stack(s) shown and described herein.

Figure 7:
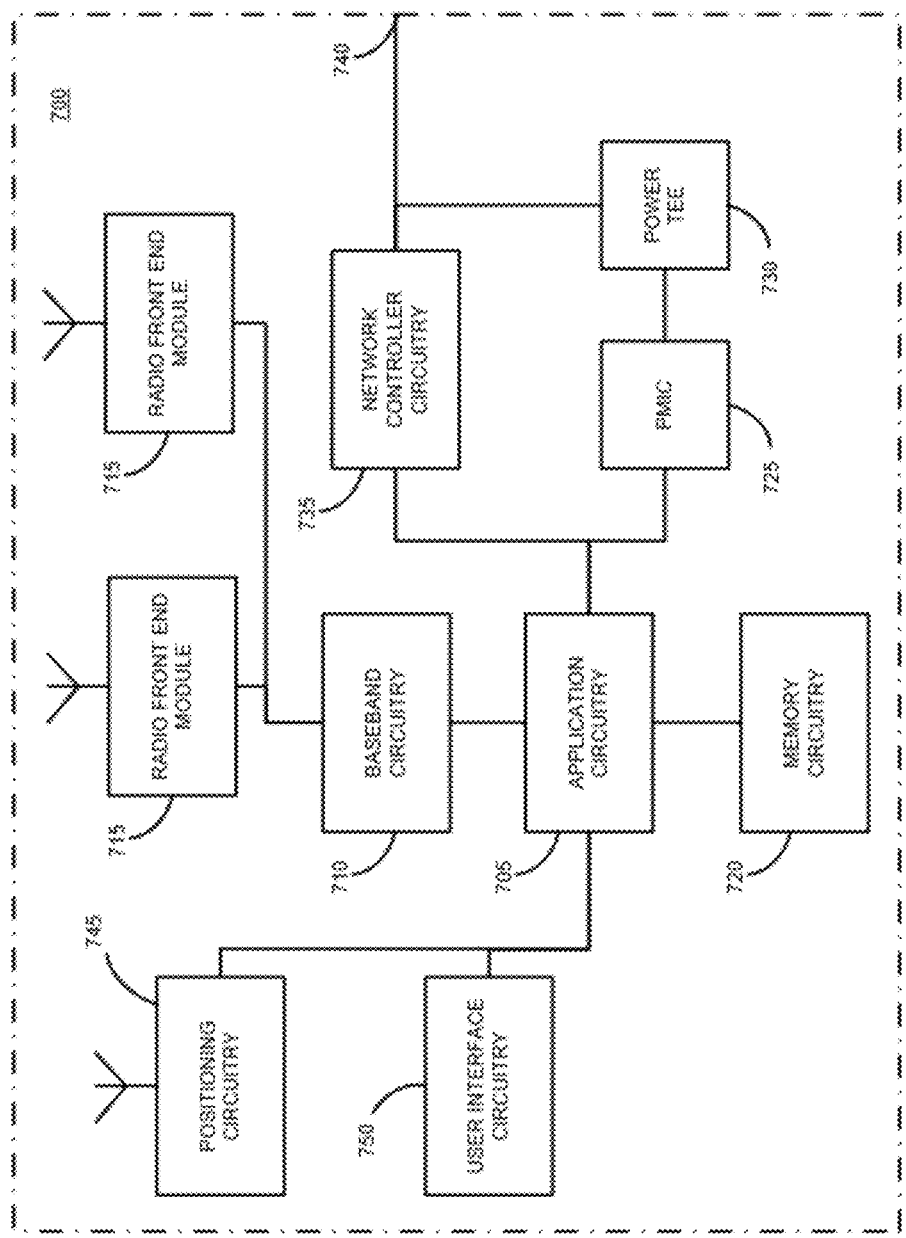
FIG. 7 illustrates an example of infrastructure equipment in accordance with various embodiments.

FIG. 7 illustrates an example of infrastructure equipment 700 in accordance with various embodiments. The infrastructure equipment 700 (or "system 700") may be implemented as a base station, radio head, RAN node, etc., such as the RAN nodes 511 and 512, and/or AP 506 shown and described previously. In other examples, the system 700 could be implemented in or by a UE, application server(s) 530, and/or any other element/device discussed herein. The system 700 may include one or more of application circuitry 705, baseband circuitry 710, one or more radio front end modules 715, memory 720, power management integrated circuitry (PMIC) 725, power tee circuitry 730, network controller 735, network interface connector 740, satellite positioning circuitry 745, and user interface 750. In some embodiments, the device XT00 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

As used herein, the term "circuitry" may refer to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD), (for example, a field-programmable gate array (FPGA), a programmable logic device (PLD), a complex PLD (CPLD), a high-capacity PLD (HCPLD), a structured ASIC, or a programmable System on Chip (SoC)), digital signal processors (DSPs), etc., that are configured to provide the described functionality. In some embodiments, the circuitry may execute one or more software or firmware programs to provide at least some of the described functionality. In addition, the term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The terms "application circuitry" and/or "baseband circuitry" may be considered synonymous to, and may be referred to as "processor circuitry." As used herein, the term "processor circuitry" may refer to, is part of, or includes circuitry capable of sequentially and automatically carrying out a sequence of arithmetic or logical operations; recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes.

Furthermore, the various components of the core network 520 (or CN 620 discussed infra) may be referred to as "network elements." The term "network element" may describe a physical or virtualized equipment used to provide wired or wireless communication network services. The term "network element" may be considered synonymous to and/or referred to as a networked computer, networking hardware, network equipment, network node, router, switch, hub, bridge, radio network controller, radio access network device, gateway, server, virtualized network function (VNF), network functions virtualization infrastructure (NFVI), and/or the like.

Application circuitry 705 may include one or more central processing unit (CPU) cores and one or more of cache memory, low drop-out voltage regulators (LDOs), interrupt controllers, serial interfaces such as SPI, I2C or universal programmable serial interface module, real time clock (RTC), timer-counters including interval and watchdog timers, general purpose input/output (I/O or IO), memory card controllers such as Secure Digital (SD/)MultiMediaCard (MMC) or similar, Universal Serial Bus (USB) interfaces, Mobile Industry Processor Interface (MIPI) interfaces and Joint Test Access Group (JTAG) test access ports. As examples, the application circuitry 705 may include one or more Intel Pentium®, Core®, or Xeon® processor(s); Advanced Micro Devices (AMD) Ryzen® processor(s), Accelerated Processing Units (APUs), or Epyc® processors; and/or the like. In some embodiments, the system 700 may not utilize application circuitry 705, and instead may include a special-purpose processor/controller to process IP data received from an EPC or 5GC, for example.

Additionally or alternatively, application circuitry 705 may include circuitry such as, but not limited to, one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 705 may comprise logic blocks or logic fabric including and other interconnected resources that may be programmed to perform various functions, such as the procedures, methods, functions, etc. of the various embodiments discussed herein. In such embodiments, the circuitry of application circuitry 705 may include memory cells (e.g., erasable programmable read-only memory (EPROM), electrically erasable programmable read-only memory (EEPROM), flash memory, static memory (e.g., static random access memory (SRAM), anti-fuses, etc.) used to store logic blocks, logic fabric, data, etc. in lookup-tables (LUTs) and the like.

The baseband circuitry 710 may be implemented, for example, as a solder-down substrate including one or more integrated circuits, a single packaged integrated circuit soldered to a main circuit board or a multi-chip module containing two or more integrated circuits. Although not shown, baseband circuitry 710 may comprise one or more digital baseband systems, which may be coupled via an interconnect subsystem to a CPU subsystem, an audio subsystem, and an interface subsystem. The digital baseband subsystems may also be coupled to a digital baseband interface and a mixed-signal baseband sub-system via another interconnect subsystem. Each of the interconnect subsystems may include a bus system, point-to-point connections, network-on-chip (NOC) structures, and/or some other suitable bus or interconnect technology, such as those discussed herein. The audio sub-system may include digital signal processing circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 710 may include protocol processing circuitry with one or more instances of control circuitry (not shown) to provide control functions for the digital baseband circuitry and/or radio frequency circuitry (for example, the radio front end modules 715).

User interface circuitry 750 may include one or more user interfaces designed to enable user interaction with the system 700 or peripheral component interfaces designed to enable peripheral component interaction with the system 700. User interfaces may include, but are not limited to one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a non-volatile memory port, a universal serial bus (USB) port, an audio jack, a power supply interface, etc.

The radio front end modules (RFEMs) 715 may comprise a millimeter wave RFEM and one or more sub-millimeter wave radio frequency integrated circuits (RFICs). In some implementations, the one or more sub-millimeter wave RFICs may be physically separated from the millimeter wave RFEM. The RFICs may include connections to one or more antennas or antenna arrays, and the RFEM may be connected to multiple antennas. In alternative implementations, both millimeter wave and sub-millimeter wave radio functions may be implemented in the same physical radio front end module 715. The RFEMs 715 may incorporate both millimeter wave antennas and sub-millimeter wave antennas.

The memory circuitry 720 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 720 may be implemented as one or more of solder down packaged integrated circuits, socketed memory modules and plug-in memory cards.

The PMIC 725 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 730 may provide for electrical power drawn from a network cable to provide both power supply and data connectivity to the infrastructure equipment 700 using a single cable.

The network controller circuitry 735 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 700 via network interface connector 740 using a physical connection, which may be electrical (commonly referred to as a "copper interconnect"), optical, or wireless. The network controller circuitry 735 may include one or more dedicated processors and/or FPGAs to communicate using one or more of the aforementioned protocol. In some implementations, the network controller circuitry 735 may include multiple controllers to provide connectivity to other networks using the same or different protocols.

The positioning circuitry 745, which may include circuitry to receive and decode signals transmitted by one or more navigation satellite constellations of a global navigation satellite system (GNSS). Examples of navigation satellite constellations (or GNSS) may include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 745 may comprise various hardware elements (e.g., including hardware devices such as switches, filters, amplifiers, antenna elements, and the like to facilitate the communications over-the-air (OTA) communications) to communicate with components of a positioning network, such as navigation satellite constellation nodes.

Nodes or satellites of the navigation satellite constellation(s) ("GNSS nodes") may provide positioning services by continuously transmitting or broadcasting GNSS signals along a line of sight, which may be used by GNSS receivers (e.g., positioning circuitry 745 and/or positioning circuitry implemented by UEs 501, 502, or the like) to determine their GNSS position. The GNSS signals may include a pseudorandom code (e.g., a sequence of ones and zeros) that is known to the GNSS receiver and a message that includes a time of transmission (ToT) of a code epoch (e.g., a defined point in the pseudorandom code sequence) and the GNSS node position at the ToT. The GNSS receivers may monitor/measure the GNSS signals transmitted/broadcasted by a plurality of GNSS nodes (e.g., four or more satellites) and solve various equations to determine a corresponding GNSS position (e.g., a spatial coordinate). The GNSS receivers also implement clocks that are typically less stable and less precise than the atomic clocks of the GNSS nodes, and the GNSS receivers may use the measured GNSS signals to determine the GNSS receivers' deviation from true time (e.g., an offset of the GNSS receiver clock relative to the GNSS node time). In some embodiments, the positioning circuitry 745 may include a Micro-Technology for Positioning, Navigation, and Timing (Micro-PNT) IC that uses a master timing clock to perform position tracking/estimation without GNSS assistance.

The GNSS receivers may measure the time of arrivals (ToAs) of the GNSS signals from the plurality of GNSS nodes according to its own clock. The GNSS receivers may determine ToF values for each received GNSS signal from the ToAs and the ToTs, and then may determine, from the ToFs, a three-dimensional (3D) position and clock deviation. The 3D position may then be converted into a latitude, longitude and altitude. The positioning circuitry 745 may provide data to application circuitry 705 which may include one or more of position data or time data. Application circuitry 705 may use the time data to synchronize operations with other radio base stations (e.g., RAN nodes 511, 512, 611 or the like).

The components shown by FIG. 7 may communicate with one another using interface circuitry. As used herein, the term "interface circuitry" may refer to, is part of, or includes circuitry providing for the exchange of information between two or more components or devices. The term "interface circuitry" may refer to one or more hardware interfaces, for example, buses, input/output (I/O) interfaces, peripheral component interfaces, network interface cards, and/or the like. Any suitable bus technology may be used in various implementations, which may include any number of technologies, including industry standard architecture (ISA), extended ISA (EISA), peripheral component interconnect (PCI), peripheral component interconnect extended (PCIx), PCI express (PCIe), or any number of other technologies. The bus may be a proprietary bus, for example, used in a SoC based system. Other bus systems may be included, such as an I2C interface, an SPI interface, point to point interfaces, and a power bus, among others.

Figure 8:
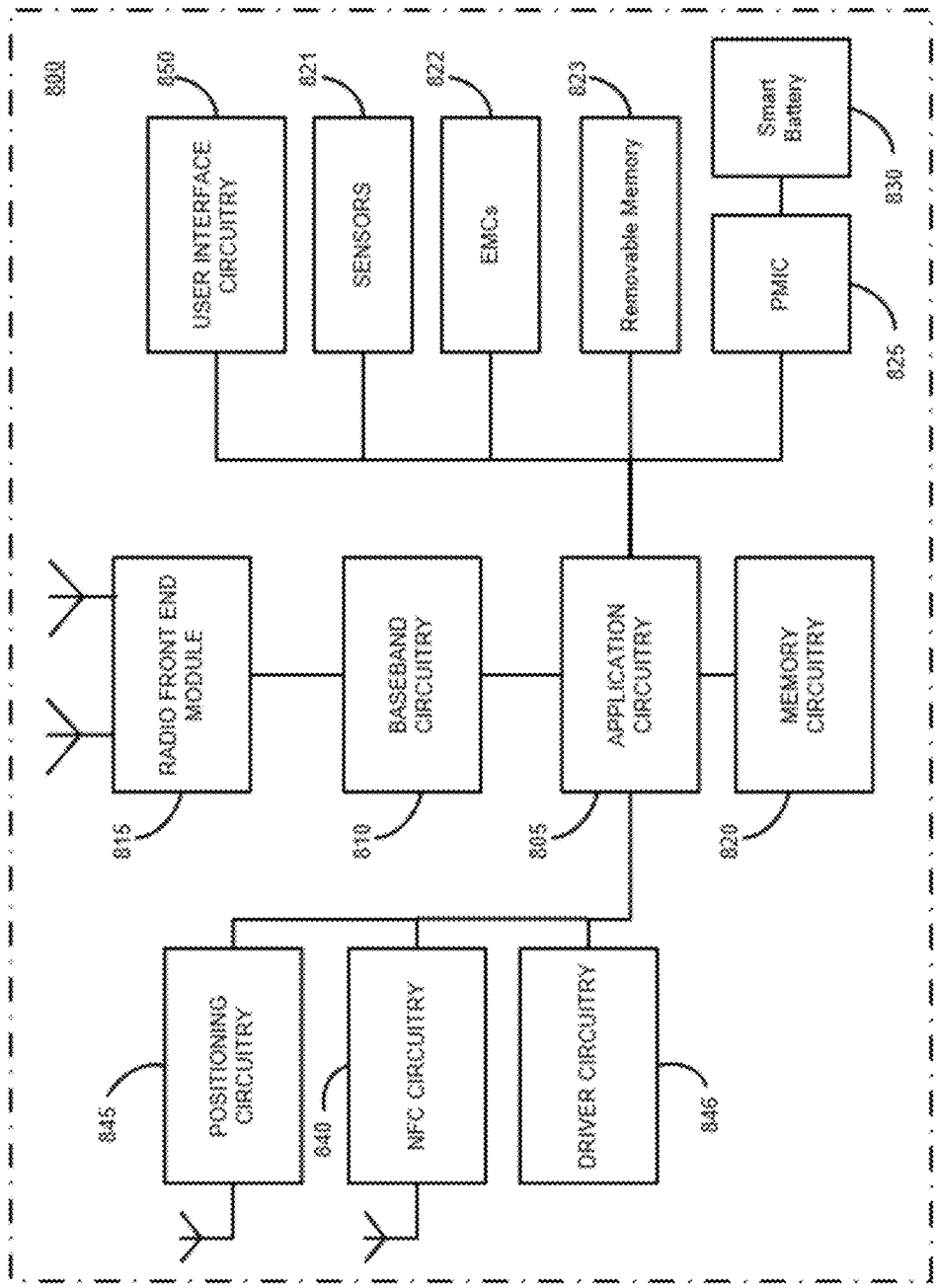
FIG. 8 illustrates an example of a platform in accordance with various embodiments.

FIG. 8 illustrates an example of a platform 800 (or "device 800") in accordance with various embodiments. In embodiments, the computer platform 800 may be suitable for use as UEs 501, 502, 601, application servers 530, and/or any other element/device discussed herein. The platform 800 may include any combinations of the components shown in the example. The components of platform 800 may be implemented as integrated circuits (ICs), portions thereof, discrete electronic devices, or other modules, logic, hardware, software, firmware, or a combination thereof adapted in the computer platform 800, or as components otherwise incorporated within a chassis of a larger system. The block diagram of FIG. 8 is intended to show a high level view of components of the computer platform 800. However, some of the components shown may be omitted, additional components may be present, and different arrangement of the components shown may occur in other implementations.

The application circuitry 805 may include circuitry such as, but not limited to single-core or multi-core processors and one or more of cache memory, low drop-out voltage regulators (LDOs), interrupt controllers, serial interfaces such as serial peripheral interface (SPI), inter-integrated circuit (I2C) or universal programmable serial interface circuit, real time clock (RTC), timer-counters including interval and watchdog timers, general purpose input-output (IO), memory card controllers such as secure digital/multimedia card (SD/MMC) or similar, universal serial bus (USB) interfaces, mobile industry processor interface (MIPI) interfaces and Joint Test Access Group (JTAG) test access ports. The processor(s) may include any combination of general-purpose processors and/or dedicated processors (e.g., graphics processors, application processors, etc.). The processors (or cores) may be coupled with or may include memory/storage and may be configured to execute instructions stored in the memory/storage to enable various applications or operating systems to run on the platform 800. In some embodiments, processors of application circuitry 705/805 may process IP data packets received from an EPC or 5GC.

Application circuitry 805 be or include a microprocessor, a multi-core processor, a multithreaded processor, an ultra-low voltage processor, an embedded processor, or other known processing element. In one example, the application circuitry 805 may include an Intel® Architecture Core™ based processor, such as a Quark™, an Atom™, an i3, an i5, an i7, or an MCU-class processor, or another such processor available from Intel® Corporation, Santa Clara, Calif. The processors of the application circuitry 805 may also be one or more of Advanced Micro Devices (AMD) Ryzen® processor(s) or Accelerated Processing Units (APUs); A5-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc; an ARM-based design licensed from ARM Holdings, Ltd.; or the like. In some implementations, the application circuitry 805 may be a part of a system on a chip (SoC) in which the application circuitry 805 and other components are formed into a single integrated circuit, or a single package, such as the Edison™ or Galileo™ SoC boards from Intel® Corporation.

Additionally or alternatively, application circuitry 805 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 805 may comprise logic blocks or logic fabric including and other interconnected resources that may be programmed to perform various functions, such as the procedures, methods, functions, etc. of the various embodiments discussed herein. In such embodiments, the circuitry of application circuitry 805 may include memory cells (e.g., erasable programmable read-only memory (EPROM), electrically erasable programmable read-only memory (EEPROM), flash memory, static memory (e.g., static random access memory (SRAM), anti-fuses, etc.) used to store logic blocks, logic fabric, data, etc. in lookup-tables (LUTs) and the like.

The baseband circuitry 820 may be implemented, for example, as a solder-down substrate including one or more integrated circuits, a single packaged integrated circuit soldered to a main circuit board or a multi-chip module containing two or more integrated circuits. Although not shown, baseband circuitry 800 may comprise one or more digital baseband systems, which may be coupled via an interconnect subsystem to a CPU subsystem, an audio subsystem, and an interface subsystem. The digital baseband subsystems may also be coupled to a digital baseband interface and a mixed-signal baseband sub-system via another interconnect subsystem. Each of the interconnect subsystems may include a bus system, point-to-point connections, network-on-chip (NOC) structures, and/or some other suitable bus or interconnect technology, such as those discussed herein. The audio sub-system may include digital signal processing circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 820 may include protocol processing circuitry with one or more instances of control circuitry (not shown) to provide control functions for the digital baseband circuitry and/or radio frequency circuitry (for example, the radio front end modules 1215).

The radio front end modules (RFEMs) 815 may comprise a millimeter wave RFEM and one or more sub-millimeter wave radio frequency integrated circuits (RFICs). In some implementations, the one or more sub-millimeter wave RFICs may be physically separated from the millimeter wave RFEM. The RFICs may include connections to one or more antennas or antenna arrays, and the RFEM may be connected to multiple antennas. In alternative implementations, both millimeter wave and sub-millimeter wave radio functions may be implemented in the same physical radio front end module 815. The RFEMs 815 may incorporate both millimeter wave antennas and sub-millimeter wave antennas.

The memory circuitry 820 may include any number and type of memory devices used to provide for a given amount of system memory. As examples, the memory circuitry 820 may include one or more of volatile memory including be random access memory (RAM), dynamic RAM (DRAM) and/or synchronous dynamic RAM (SDRAM), and nonvolatile memory (NVM) including high-speed electrically erasable memory (commonly referred to as Flash memory), phase change random access memory (PRAM), magnetoresistive random access memory (MRAM), etc. The memory circuitry 820 may be developed in accordance with a Joint Electron Devices Engineering Council (JEDEC) low power double data rate (LPDDR)-based design, such as LPDDR2, LPDDR3, LPDDR4, or the like. Memory circuitry 720 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 820 may be on-die memory or registers associated with the application circuitry 805. To provide for persistent storage of information such as data, applications, operating systems and so forth, memory circuitry 820 may include one or more mass storage devices, which may include, inter alia, a solid state disk drive (SSDD), hard disk drive (HDD), a micro HDD, resistance change memories, phase change memories, holographic memories, or chemical memories, among others. For example, the computer platform 800 may incorporate the three-dimensional (3D) cross-point (XPOINT) memories from Intel® and Micron®.

Removable memory circuitry 823 may include devices, circuitry, enclosures/housings, ports or receptacles, etc. used to coupled portable data storage devices with the platform 800. These portable data storage devices may be used for mass storage purposes, and may include, for example, flash memory cards (e.g., Secure Digital (SD) cards, microSD cards, xD picture cards, and the like), and USB flash drives, optical discs, eternal HDDs, and the like.

The platform 800 may also include interface circuitry (not shown) that is used to connect eternal devices with the platform 800. The external devices connected to the platform 800 via the interface circuitry may include sensors 821, such as accelerometers, level sensors, flow sensors, temperature sensors, pressure sensors, barometric pressure sensors, and the like. The interface circuitry may be used to connect the platform 800 to electro-mechanical components (EMCs) 822, which may allow platform 800 to change its state, position, and/or orientation, or move or control a mechanism or system. The EMCs 822 may include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform 800 may be configured to operate one or more EMCs 822 based on one or more captured events and/or instructions or control signals received from a service provider and/or various clients.

In some implementations, the interface circuitry may connect the platform 800 with positioning circuitry 845, which may be the same or similar as the positioning circuitry 845 discussed with regard to FIG. 7.

In some implementations, the interface circuitry may connect the platform 800 with near-field communication (NFC) circuitry 840, which may include an NFC controller coupled with an antenna element and a processing device. The NFC circuitry 840 may be configured to read electronic tags and/or connect with another NFC-enabled device.

The driver circuitry 846 may include software and hardware elements that operate to control particular devices that are embedded in the platform 800, attached to the platform 800, or otherwise communicatively coupled with the platform 800. The driver circuitry 846 may include individual drivers allowing other components of the platform 800 to interact or control various input/output (I/O) devices that may be present within, or connected to, the platform 800. For example, driver circuitry 846 may include a display driver to control and allow access to a display device, a touchscreen driver to control and allow access to a touchscreen interface of the platform 800, sensor drivers to obtain sensor readings of sensors 821 and control and allow access to sensors 821, EMC drivers to obtain actuator positions of the EMCs 822 and/or control and allow access to the EMCs 822, a camera driver to control and allow access to an embedded image capture device, audio drivers to control and allow access to one or more audio devices.

The power management integrated circuitry (PMIC) 825 (also referred to as "power management circuitry 825") may manage power provided to various components of the platform 800. In particular, with respect to the baseband circuitry 820, the PMIC 825 may control power-source selection, voltage scaling, battery charging, or DC-to-DC conversion. The PMIC 825 may often be included when the platform 800 is capable of being powered by a battery 830, for example, when the device is included in a UE 501, 502, 601.

In some embodiments, the PMIC 825 may control, or otherwise be part of, various power saving mechanisms of the platform 800. For example, if the platform 800 is in an RRC_Connected state, where it is still connected to the RAN node as it expects to receive traffic shortly, then it may enter a state known as Discontinuous Reception Mode (DRX) after a period of inactivity. During this state, the platform 800 may power down for brief intervals of time and thus save power. If there is no data traffic activity for an extended period of time, then the platform 800 may transition off to an RRC_Idle state, where it disconnects from the network and does not perform operations such as channel quality feedback, handover, etc. The platform 800 goes into a very low power state and it performs paging where again it periodically wakes up to listen to the network and then powers down again. The platform 800 may not receive data in this state, in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 830 may power the platform 800, although in some examples the platform 800 may be mounted deployed in a fixed location, and may have a power supply coupled to an electrical grid. The battery 830 may be a lithium ion battery, a metal-air battery, such as a zinc-air battery, an aluminum-air battery, a lithium-air battery, and the like. In some implementations, such as in V2X applications, the battery 830 may be a typical lead-acid automotive battery.

In some implementations, the battery 830 may be a "smart battery," which includes or is coupled with a Battery Management System (BMS) or battery monitoring integrated circuitry. The BMS may be included in the platform 800 to track the state of charge (SoCh) of the battery 830. The BMS may be used to monitor other parameters of the battery 830 to provide failure predictions, such as the state of health (SoH) and the state of function (SoF) of the battery 830. The BMS may communicate the information of the battery 830 to the application circuitry 805 or other components of the platform 800. The BMS may also include an analog-to-digital (ADC) convertor that allows the application circuitry 805 to directly monitor the voltage of the battery 830 or the current flow from the battery 830. The battery parameters may be used to determine actions that the platform 800 may perform, such as transmission frequency, network operation, sensing frequency, and the like.

A power block, or other power supply coupled to an electrical grid may be coupled with the BMS to charge the battery 830. In some examples, the power block 528 may be replaced with a wireless power receiver to obtain the power wirelessly, for example, through a loop antenna in the computer platform 800. In these examples, a wireless battery charging circuit may be included in the BMS. The specific charging circuits chosen may depend on the size of the battery 830, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

Although not shown, the components of platform 800 may communicate with one another using a suitable bus technology, which may include any number of technologies, including industry standard architecture (ISA), extended ISA (EISA), peripheral component interconnect (PCI), peripheral component interconnect extended (PCIx), PCI express (PCIe), a Time-Trigger Protocol (TTP) system, or a Fle10ay system, or any number of other technologies. The bus may be a proprietary bus, for example, used in a SoC based system. Other bus systems may be included, such as an I2C interface, an SPI interface, point to point interfaces, and a power bus, among others.

Figure 9:
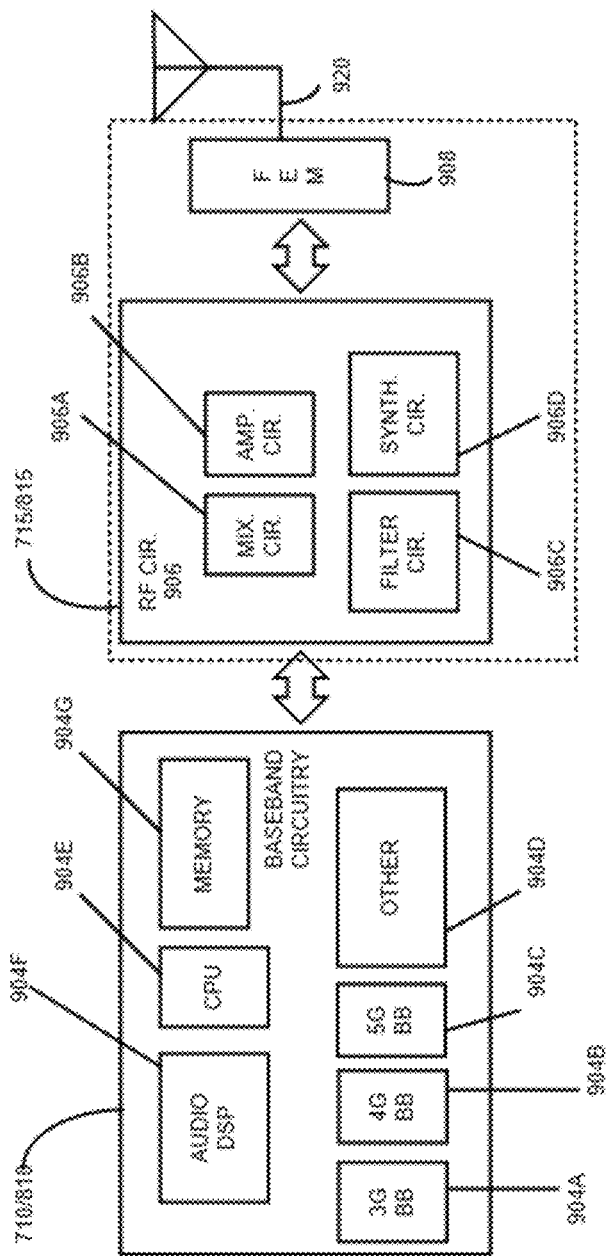
FIG. 9 illustrates example components of baseband circuitry and radio front end modules in accordance with various embodiments.

FIG. 9 illustrates example components of baseband circuitry 710/810 and radio front end modules (RFEM) 715/815 in accordance with some embodiments. As shown, the RFEM 715/815 may include Radio Frequency (RF) circuitry 1306, front-end module (FEM) circuitry 908, one or more antennas 920 coupled together at least as shown.

The baseband circuitry 710/810 may include circuitry such as, but not limited to, one or more single-core or multi-core processors. The baseband circuitry 710/810 may include one or more baseband processors or control logic to process baseband signals received from a receive signal path of the RF circuitry 906 and to generate baseband signals for a transmit signal path of the RF circuitry 906. Baseband processing circuity 710/80 may interface with the application circuitry 705/805 for generation and processing of the baseband signals and for controlling operations of the RF circuitry 906. For example, in some embodiments, the baseband circuitry 710/80 may include a third generation (3G) baseband processor 904A, a fourth generation (4G) baseband processor 904B, a fifth generation (5G) baseband processor 904C, or other baseband processor(s) 904D for other existing generations, generations in development or to be developed in the future (e.g., second generation (2G), sixth generation (6G), etc.). The baseband circuitry 710/810 (e.g., one or more of baseband processors 904A-D) may handle various radio control functions that enable communication with one or more radio networks via the RF circuitry 906. In other embodiments, some or all of the functionality of baseband processors 904A-D may be included in modules stored in the memory 904G and executed via a Central Processing Unit (CPU) 904E. The radio control functions may include, but are not limited to, signal modulation/demodulation, encoding/decoding, radio frequency shifting, etc. In some embodiments, modulation/demodulation circuitry of the baseband circuitry 710/810 may include Fast-Fourier Transform (FFT), precoding, or constellation mapping/demapping functionality. In some embodiments, encoding/decoding circuitry of the baseband circuitry 710/810 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 710/810 may include one or more audio digital signal processor(s) (DSP) 904F. The audio DSP(s) 904F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 710/810 and the application circuitry 705/805 may be implemented together such as, for example, on a system on a chip (SOC).

In some embodiments, the baseband circuitry 710/810 may provide for communication compatible with one or more radio technologies. For example, in some embodiments, the baseband circuitry 710/810 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry 710/810 is configured to support radio communications of more than one wireless protocol may be referred to as multi-mode baseband circuitry.

RF circuitry 906 may enable communication with wireless networks using modulated electromagnetic radiation through a non-solid medium. In various embodiments, the RF circuitry 906 may include switches, filters, amplifiers, etc. to facilitate the communication with the wireless network. RF circuitry 906 may include a receive signal path which may include circuitry to down-convert RF signals received from the FEM circuitry 808 and provide baseband signals to the baseband circuitry 710/810. RF circuitry 906 may also include a transmit signal path which may include circuitry to up-convert baseband signals provided by the baseband circuitry 710/810 and provide RF output signals to the FEM circuitry 808 for transmission.

In some embodiments, the receive signal path of the RF circuitry 906 may include mixer circuitry 906a, amplifier circuitry 906b and filter circuitry 906c. In some embodiments, the transmit signal path of the RF circuitry 906 may include filter circuitry 906c and mixer circuitry 906a. RF circuitry 906 may also include synthesizer circuitry 906d for synthesizing a frequency for use by the mixer circuitry 906a of the receive signal path and the transmit signal path. In some embodiments, the mixer circuitry 906a of the receive signal path may be configured to down-convert RF signals received from the FEM circuitry 808 based on the synthesized frequency provided by synthesizer circuitry 906d. The amplifier circuitry 906b may be configured to amplify the down-converted signals and the filter circuitry 906c may be a low-pass filter (LPF) or band-pass filter (BPF) configured to remove unwanted signals from the down-converted signals to generate output baseband signals. Output baseband signals may be provided to the baseband circuitry 710/810 for further processing. In some embodiments, the output baseband signals may be zero-frequency baseband signals, although this is not a requirement. In some embodiments, mixer circuitry 906a of the receive signal path may comprise passive mixers, although the scope of the embodiments is not limited in this respect.

In some embodiments, the mixer circuitry 906a of the transmit signal path may be configured to up-convert input baseband signals based on the synthesized frequency provided by the synthesizer circuitry 906d to generate RF output signals for the FEM circuitry 908. The baseband signals may be provided by the baseband circuitry 710/810 and may be filtered by filter circuitry 906c.

In some embodiments, the mixer circuitry 906a of the receive signal path and the mixer circuitry 906a of the transmit signal path may include two or more mixers and may be arranged for quadrature downconversion and upconversion, respectively. In some embodiments, the mixer circuitry 906a of the receive signal path and the mixer circuitry 906a of the transmit signal path may include two or more mixers and may be arranged for image rejection (e.g., Hartley image rejection). In some embodiments, the mixer circuitry 906a of the receive signal path and the mixer circuitry 906a may be arranged for direct downconversion and direct upconversion, respectively. In some embodiments, the mixer circuitry 906a of the receive signal path and the mixer circuitry 906a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 906 may include analog-to-digital converter (ADC) and digital-to-analog converter (DAC) circuitry and the baseband circuitry 710/810 may include a digital baseband interface to communicate with the RF circuitry 906.

In some dual-mode embodiments, a separate radio IC circuitry may be provided for processing signals for each spectrum, although the scope of the embodiments is not limited in this respect.

In some embodiments, the synthesizer circuitry 906d may be a fractional-N synthesizer or a fractional N/N+1 synthesizer, although the scope of the embodiments is not limited in this respect as other types of frequency synthesizers may be suitable. For example, synthesizer circuitry 906d may be a delta-sigma synthesizer, a frequency multiplier, or a synthesizer comprising a phase-locked loop with a frequency divider.

The synthesizer circuitry 906d may be configured to synthesize an output frequency for use by the mixer circuitry 906a of the RF circuitry 906 based on a frequency input and a divider control input. In some embodiments, the synthesizer circuitry 906d may be a fractional N/N+1 synthesizer.

In some embodiments, frequency input may be provided by a voltage controlled oscillator (VCO), although that is not a requirement. Divider control input may be provided by either the baseband circuitry 710/810 or the applications processor 705/805 depending on the desired output frequency. In some embodiments, a divider control input (e.g., N) may be determined from a look-up table based on a channel indicated by the applications processor 705/805.

Synthesizer circuitry 906d of the RF circuitry 906 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 906d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 906 may include an IQ/polar converter.

FEM circuitry 908 may include a receive signal path which may include circuitry configured to operate on RF signals received from one or more antennas 920, amplify the received signals and provide the amplified versions of the received signals to the RF circuitry 906 for further processing. FEM circuitry 908 may also include a transmit signal path which may include circuitry configured to amplify signals for transmission provided by the RF circuitry 906 for transmission by one or more of the one or more antennas 920. In various embodiments, the amplification through the transmit or receive signal paths may be done solely in the RF circuitry 906, solely in the FEM 908, or in both the RF circuitry 906 and the FEM 908.

In some embodiments, the FEM circuitry 908 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 906). The transmit signal path of the FEM circuitry 908 may include a power amplifier (PA) to amplify input RF signals (e.g., provided by RF circuitry 906), and one or more filters to generate RF signals for subsequent transmission (e.g., by one or more of the one or more antennas 920).

Processors of the application circuitry 705/805 and processors of the baseband circuitry 710/810 may be used to execute elements of one or more instances of a protocol stack. For example, processors of the baseband circuitry 710/810, alone or in combination, may be used execute Layer 3, Layer 2, or Layer 1 functionality, while processors of the baseband circuitry 710/810 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 10:
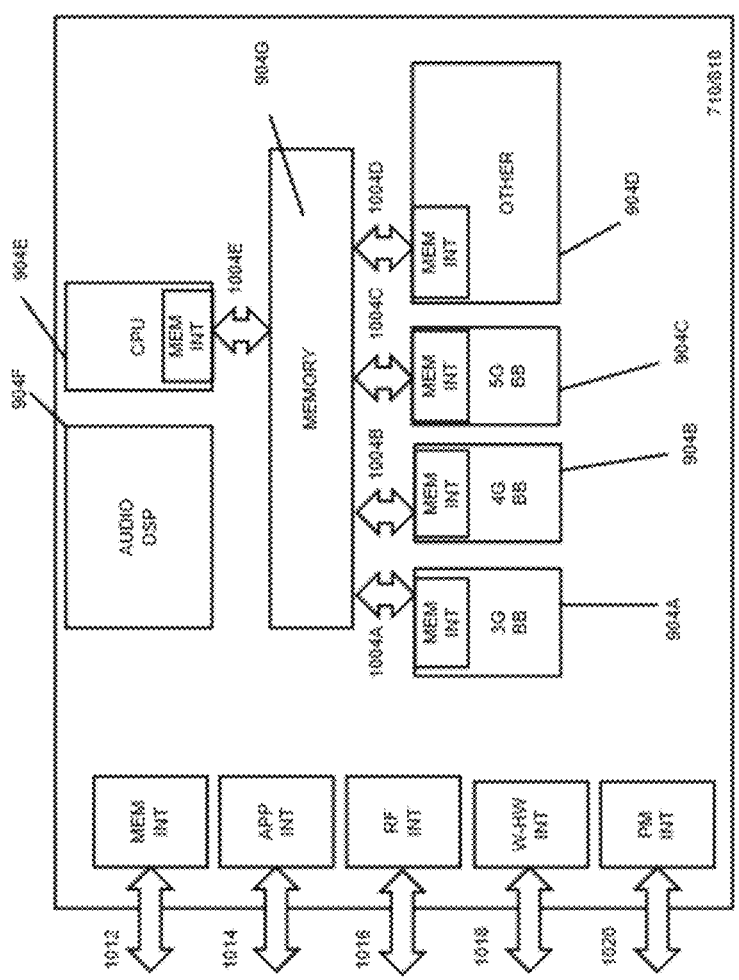
FIG. 10 illustrates example interfaces of baseband circuitry in accordance with some embodiments.

FIG. 10 illustrates example interfaces of baseband circuitry in accordance with some embodiments. As discussed above, the baseband circuitry 710/810 of FIGS. 7-8 may comprise processors 804A-804E and a memory 904G utilized by said processors. Each of the processors 904A-904E may include a memory interface, 1004A-1004E, respectively, to send/receive data to/from the memory 904G.

The baseband circuitry 710/810 may further include one or more interfaces to communicatively couple to other circuitries/devices, such as a memory interface 1012 (e.g., an interface to send/receive data to/from memory external to the baseband circuitry 710/1210), an application circuitry interface 1014 (e.g., an interface to send/receive data to/from the application circuitry 705/805 of FIGS. 7-8), an RF circuitry interface 1016 (e.g., an interface to send/receive data to/from RF circuitry 906 of FIG. 9), a wireless hardware connectivity interface 1018 (e.g., an interface to send/receive data to/from Near Field Communication (NFC) components, Bluetooth® components (e.g., Bluetooth® Low Energy), Wi-Fi® components, and other communication components), and a power management interface 1020 (e.g., an interface to send/receive power or control signals to/from the PMIC 825.

Figure 11:
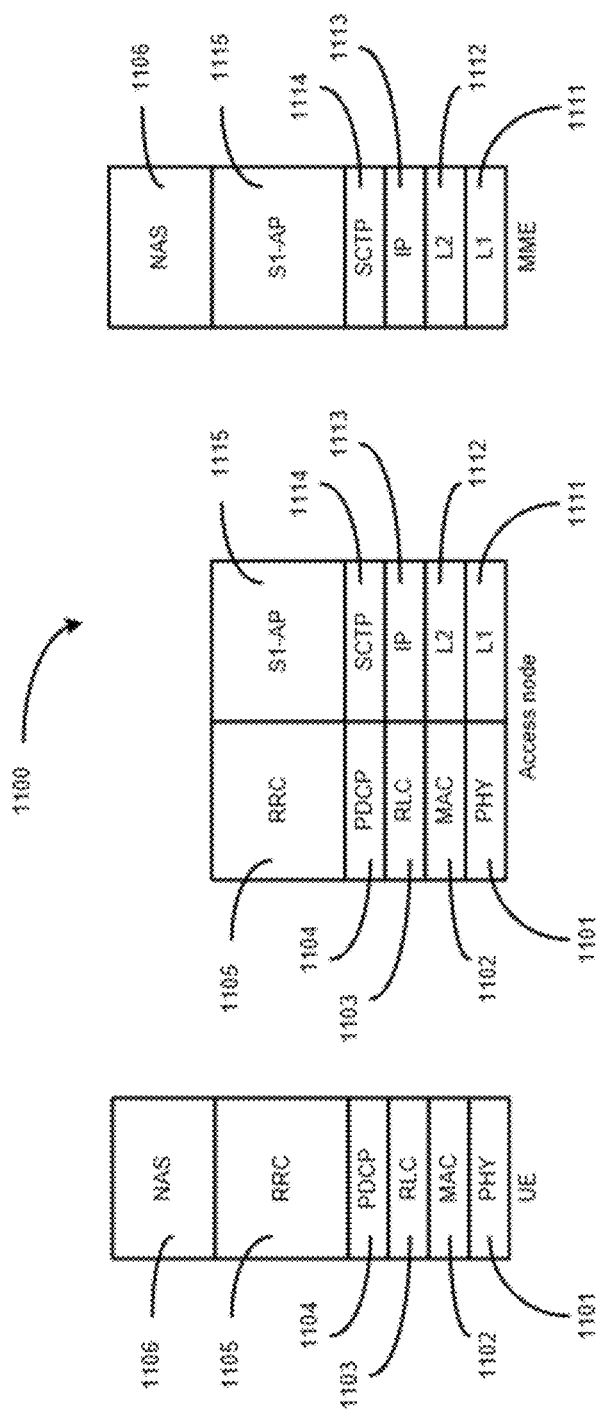
FIG. 11 is an illustration of a control plane protocol stack in accordance with some embodiments.

FIG. 11 is an illustration of a control plane protocol stack in accordance with some embodiments. In this embodiment, a control plane 1100 is shown as a communications protocol stack between the UE 501 (or alternatively, the UE 502), the RAN node 511 (or alternatively, the RAN node 512), and the MME 521.

The PHY layer 1101 may transmit or receive information used by the MAC layer 1102 over one or more air interfaces. The PHY layer 1101 may further perform link adaptation or adaptive modulation and coding (AMC), power control, cell search (e.g., for initial synchronization and handover purposes), and other measurements used by higher layers, such as the RRC layer 1105. The PHY layer 1101 may still further perform error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing.

The MAC layer 1102 may perform mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from the PHY via transport channels, multiplexing MAC SDUs onto TBs, scheduling information reporting, error correction through hybrid automatic repeat request (HARD), and logical channel prioritization.

The RLC layer 1103 may operate in a plurality of modes of operation, including: Transparent Mode (TM), Unacknowledged Mode (UM), and Acknowledged Mode (AM). The RLC layer 1103 may execute transfer of upper layer protocol data units (PDUs), error correction through automatic repeat request (ARQ) for AM data transfers, and concatenation, segmentation and reassembly of RLC SDUs for UM and AM data transfers. The RLC layer 1103 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

The PDCP layer 1104 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

The main services and functions of the RRC layer 1105 may include broadcast of system information (e.g., included in Master Information Blocks (MIBs) or System Information Blocks (SIBs) related to the non-access stratum (NAS)), broadcast of system information related to the access stratum (AS), paging, establishment, maintenance and release of an RRC connection between the UE and E-UTRAN (e.g., RRC connection paging, RRC connection establishment, RRC connection modification, and RRC connection release), establishment, configuration, maintenance and release of point to point Radio Bearers, security functions including key management, inter radio access technology (RAT) mobility, and measurement configuration for UE measurement reporting. Said MIBs and SIBs may comprise one or more information elements (IEs), which may each comprise individual data fields or data structures.

The UE 501 and the RAN node 511 may utilize a Uu interface (e.g., an LTE-Uu interface) to exchange control plane data via a protocol stack comprising the PHY layer 1101, the MAC layer 1102, the RLC layer 1103, the PDCP layer 1104, and the RRC layer 1105.

The non-access stratum (NAS) protocols 1106 form the highest stratum of the control plane between the UE 501 and the MME 521. The NAS protocols 1106 support the mobility of the UE 501 and the session management procedures to establish and maintain IP connectivity between the UE 501 and the P-GW 523.

The S1 Application Protocol (S1-AP) layer 1115 may support the functions of the S1 interface and comprise Elementary Procedures (EPs). An EP is a unit of interaction between the RAN node 511 and the CN 520. The S1-AP layer services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The Stream Control Transmission Protocol (SCTP) layer (alternatively referred to as the SCTP/IP layer) 1114 may ensure reliable delivery of signaling messages between the RAN node 511 and the MME 521 based, in part, on the IP protocol, supported by the IP layer 1113. The L2 layer 1112 and the L1 layer 1111 may refer to communication links (e.g., wired or wireless) used by the RAN node and the MME to exchange information.

The RAN node 511 and the MME 521 may utilize an S1-MME interface to exchange control plane data via a protocol stack comprising the L1 layer 1111, the L2 layer 1112, the IP layer 1113, the SCTP layer 1114, and the S1-AP layer 1115.

Figure 12:
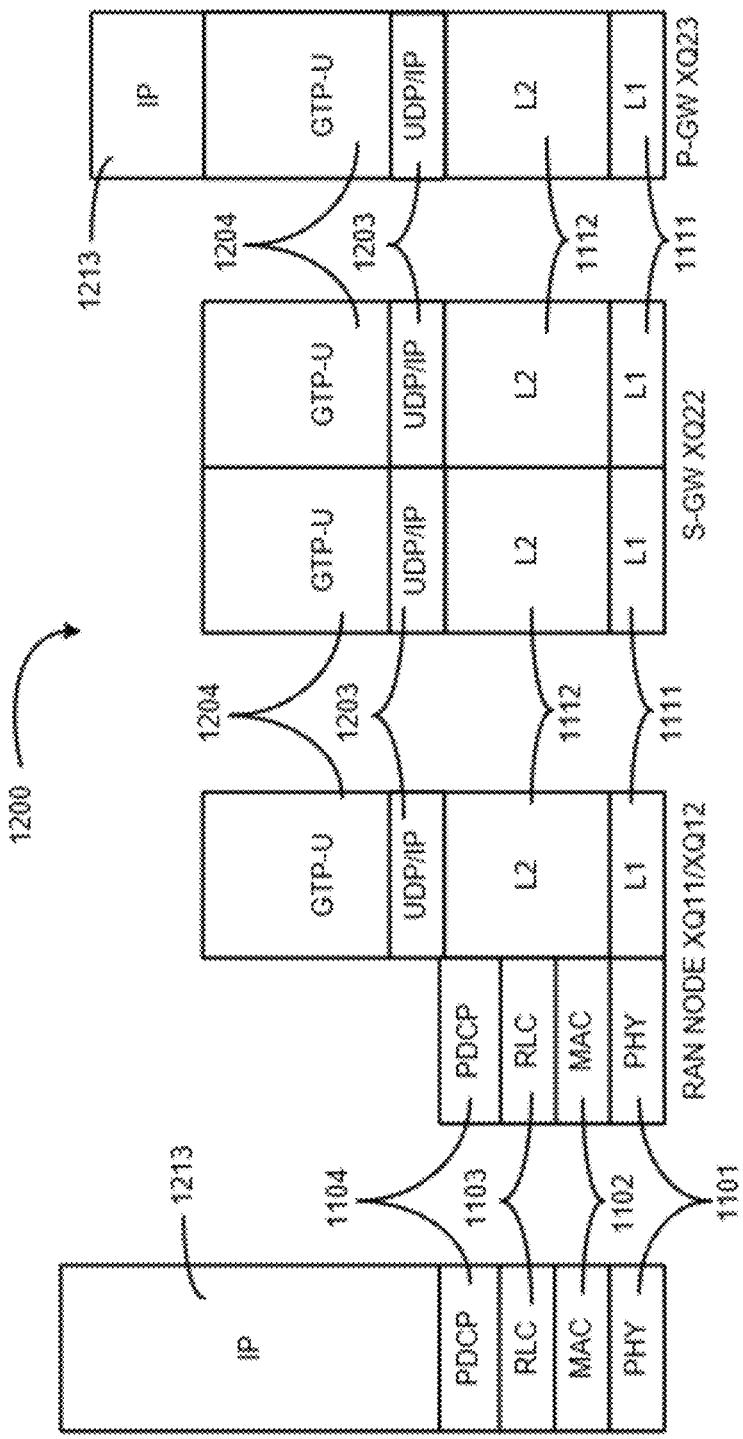
FIG. 12 is an illustration of a user plane protocol stack in accordance with some embodiments.

FIG. 12 is an illustration of a user plane protocol stack in accordance with some embodiments. In this embodiment, a user plane 1200 is shown as a communications protocol stack between the UE 501 (or alternatively, the UE 502), the RAN node 511 (or alternatively, the RAN node 512), the S-GW 522, and the P-GW 523. The user plane 1200 may utilize at least some of the same protocol layers as the control plane 1500. For example, the UE 501 and the RAN node 511 may utilize a Uu interface (e.g., an LTE-Uu interface) to exchange user plane data via a protocol stack comprising the PHY layer 1501, the MAC layer 1502, the RLC layer 1503, the PDCP layer 1504.

The General Packet Radio Service (GPRS) Tunneling Protocol for the user plane (GTP-U) layer 1204 may be used for carrying user data within the GPRS core network and between the radio access network and the core network. The user data transported can be packets in any of IPv4, IPv6, or PPP formats, for example. The UDP and IP security (UDP/IP) layer 1203 may provide checksums for data integrity, port numbers for addressing different functions at the source and destination, and encryption and authentication on the selected data flows. The RAN node 511 and the S-GW 522 may utilize an S1-U interface to exchange user plane data via a protocol stack comprising the L1 layer 1511, the L2 layer 1512, the UDP/IP layer 1203, and the GTP-U layer 1204. The S-GW 522 and the P-GW 523 may utilize an S5/S8a interface to exchange user plane data via a protocol stack comprising the L1 layer 1511, the L2 layer 1512, the UDP/IP layer 1203, and the GTP-U layer 1204. As discussed above with respect to FIG. 15, NAS protocols support the mobility of the UE 501 and the session management procedures to establish and maintain IP connectivity between the UE 501 and the P-GW 523.

Figure 13:
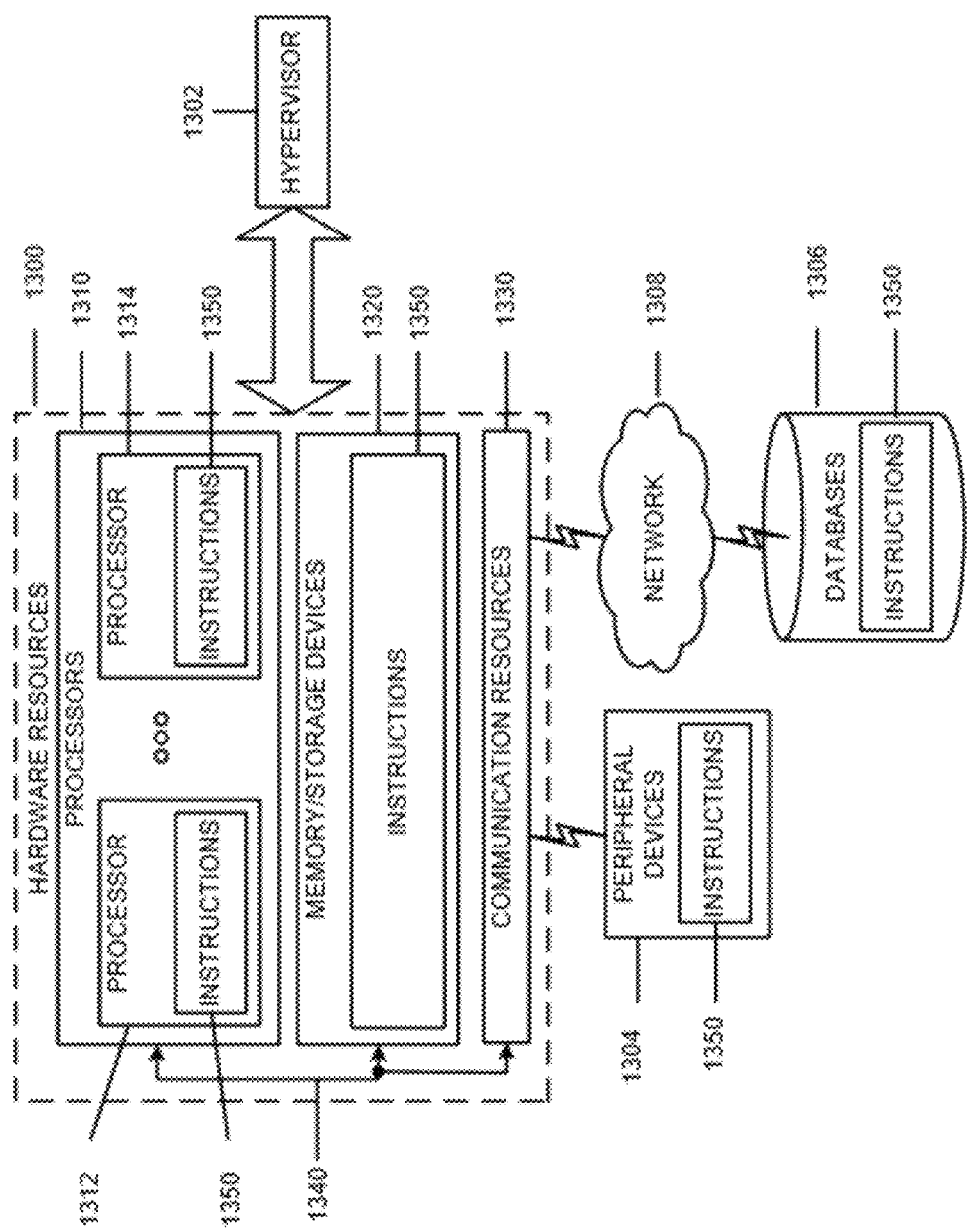
FIG. 13 is a block diagram illustrating components, according to some example embodiments, able to read instructions from a machine-readable or computer-readable medium (e.g., a non-transitory machine-readable storage medium) and perform any one or more of the methodologies discussed herein.

FIG. 13 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 13 shows a diagrammatic representation of hardware resources 1300 including one or more processors (or processor cores) 1310, one or more memory/storage devices 1320, and one or more communication resources 1330, each of which may be communicatively coupled via a bus 1340. As used herein, the term "computing resource", "hardware resource", etc., may refer to a physical or virtual device, a physical or virtual component within a computing environment, and/or physical or virtual component within a particular device, such as computer devices, mechanical devices, memory space, processor/CPU time and/or processor/CPU usage, processor and accelerator loads, hardware time or usage, electrical power, input/output operations, ports or network sockets, channel/link allocation, throughput, memory usage, storage, network, database and applications, and/or the like. For embodiments where node virtualization (e.g., NFV) is utilized, a hypervisor 1302 may be executed to provide an execution environment for one or more network slices/sub-slices to utilize the hardware resources 1300. A "virtualized resource" may refer to compute, storage, and/or network resources provided by virtualization infrastructure to an application, device, system, etc.

The processors 1310 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1312 and a processor 1314.

The memory/storage devices 1320 may include main memory, disk storage, or any suitable combination thereof. The memory/storage devices 1320 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1330 may include interconnection or network interface components or other suitable devices to communicate with one or more peripheral devices 1304 or one or more databases 1306 via a network 1308. For example, the communication resources 1330 may include wired communication components (e.g., for coupling via a Universal Serial Bus (USB)), cellular communication components, NFC components, Bluetooth® components (e.g., Bluetooth® Low Energy), Wi-Fi® components, and other communication components. As used herein, the term "network resource" or "communication resource" may refer to computing resources that are accessible by computer devices via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

Instructions 1350 may comprise software, a program, an application, an applet, an app, or other executable code for causing at least any of the processors 1310 to perform any one or more of the methodologies discussed herein. The instructions 1350 may reside, completely or partially, within at least one of the processors 1310 (e.g., within the processor's cache memory), the memory/storage devices 1320, or any suitable combination thereof. Furthermore, any portion of the instructions 1350 may be transferred to the hardware resources 1300 from any combination of the peripheral devices 1304 or the databases 1306. Accordingly, the memory of processors 1310, the memory/storage devices 1320, the peripheral devices 1304, and the databases 1306 are examples of computer-readable and machine-readable media.

In some embodiments, the electronic device(s), network(s), system(s), chip(s) or component(s), or portions or implementations thereof, of FIGS. 5-13, or some other figure herein may be configured to perform one or more processes, techniques, or methods as described herein, or portions thereof. For example, the device of FIGS. 7, 8, and 13, and particularly, the baseband circuitry of FIGS. 9 and 10, may be configured to implement one or more of the processes described herein (for example, the operation flows/algorithmic structures of FIGS. 4(a)-4(b)).

EXAMPLES

Example 1 may include a system and method of wireless communication for a fifth generation (5G) or new radio (NR) system: determined, by UE, a multiplexing rule in case of partial overlapping of multiple uplink signals. transmitted, by UE, one or more uplink signals in accordance with the multiplexing rule.

Example 2 may include the subject matter of example 1 or some other example herein, wherein in case of partial overlapping of multiple uplink channels with the same starting symbol, UE multiplexes multiple UCI types and carry them into one of multiple uplink channels in accordance with the rule used for simultaneous transmission of multiple UCI types with fully overlapping.

Example 3 may include the subject matter of example 2 or some other example herein, wherein in case of partial overlapping between PUCCH format 2/3/4 carrying HARQ-ACK (and/or CSI) and PUCCH format 0/1 configured for SR transmission, UE transmits HARQ-ACK (and/or CSI) and SR together on the HARQ-ACK PUCCH resource using PUCCH format 2 resource of PUCCH format 3 resource or PUCCH format 4 resource that includes $M_{RB}^{PUCCH}$ PRBs, with $M_{RB,max}^{PUCCH} \geq M_{RB}^{PUCCH} > 1$ and $M_{RB,max}^{PUCCH} = 16$, where UE determines a number of PRBs $M_{RB,min}^{PUCCH}$ for the PUCCH transmission to be the minimum number of PRBs, that is smaller than or equal to $M_{RB}^{PUCCH}$ PRBs which are provided by higher layer parameter PUCCH-F2-number-of-PRBs or PUCCH-F3-number-of-PRBs and starts from the first PRB from the set of number of PRBs {1, 2, ..., 16} for PUCCH format 2 or from the set of number of PRBs {1-6, 8-10, 12, 15, 16} for PUCCH format 3.

Example 4 may include the subject matter of example 2 or some other example herein, wherein in case of partial overlapping between PUCCH format 2/3/4 carrying HARQ-ACK (and/or CSI) and PUCCH format 0/1 configured for SR transmission, UE transmits HARQ-ACK (and/or CSI) and SR together on the HARQ-ACK PUCCH resource using PUCCH format 2 resource of PUCCH format 3 resource or PUCCH format 4 resource that includes $M_{RB}^{PUCCH}$ PRBs with $M_{RB,max}^{PUCCH} \geq M_{RB}^{PUCCH} > 1$ and $M_{RB,max}^{PUCCH} > 16$. In that case, UE may determine a number of PRBs $M_{RB,min}^{PUCCH}$ for the PUCCH transmission to be the minimum number of PRBs, that is smaller than or equal to $M_{RB}^{PUCCH}$ PRBs which may be provided by higher layer parameter PUCCH-F2-number-of-PRBs or PUCCH-F3-number-of-PRBs and may start from the first PRB from the set of number of PRBs {1, 2, ..., $M_{RB,max}^{PUCCH}$} for PUCCH format 2 or from a set of number of PRBs ranging between 1 and $M_{RB,max}^{PUCCH}$, where each number within the set can be factorized into the form $2^i \cdot 3^j \cdot 5^k$, with i, j, k being integers, for PUCCH format 3.

Example 5 may include the subject matter of example 2 or some other example herein, wherein in case UE has CSI transmission occasion(s) configured with the same starting symbol as a HARQ-ACK/SR transmission, where the HARQ-ACK information, if any, is in response to a PDSCH reception without a corresponding PDCCH and there are single or multiple CSI PUCCH based-reports, UE determines a j-th PUCCH resource 2 or a PUCCH resource 3 or a PUCCH resource 4 from J PUCCH resources (which are indexed in ascending order of payload carrying capacity; as an example J≤2), where j can assume a value within the range 0≤j≤J−1 and transmit combined HARQ-ACK/SR and CSI bits on the determined PUCCH resource. UE selects $N_{CSI}^{reported}$ CSI report(s) for transmission together with HARQ-ACK/SR (if any) in ascending order of pre-defined priority rule and drop certain CSI bit(s), if the total payload to be transmitted is greater than the payload carrying capacity of the PUCCH format 2 resource J−1, or the PUCCH format 3 resource J−1 or the PUCCH format 4 resource J−1.

Example 6 may include the subject matter of example 2 or some other example herein, wherein in case UE has CSI transmission occasion(s) configured with the same starting symbol as a HARQ-ACK/SR transmission, where the HARQ-ACK information to be transmitted is in response to a PDSCH reception with a corresponding PDCCH or in response to a PDCCH indicating SPS PDSCH release, and there are single or multiple wideband CSI report(s) to transmit, UE first determines one multi-CSI PUCCH resource to combine one or multiple wideband CSI report(s) onto it as described in claim 5 (assuming zero HARQ-ACK/SR bits) and in the next action, UE handles the multiplexing between HARQ-ACK/SR and the combined CSI bits. UE determines a PUCCH resource set from a number of configured PUCCH resource sets for HARQ-ACK/SR transmissions based on the total UCI payload to be transmitted. Subsequently, UE determines a PUCCH format 2 resource or a PUCCH format 3 resource or PUCCH format 4 resource with higher layer parameter PUCCH-F2-simultaneous-HARQ-ACK-CSI=TRUE, or PUCCH-F3-simultaneous-HARQ-ACK-CSI=TRUE or PUCCH-F4-simultaneous-HARQ-ACK-CSI=TRUE within the determined PUCCH resource set based on a PUCCH resource indicator field in a last DCI (downlink control information) format 1_0 or DCI format 1_1 that the UE detects and for which UE transmits corresponding HARQ-ACK information in the PUCCH. On the determined PUCCH resource, UE transmits the combined HARQ-ACK/SR and wideband CSI reports bits using $M_{RB,min}^{PUCCH}$ PRBs selected as described in claim 3. UE selects $N_{CSI}^{reported}$ CSI report(s) for transmission together with HARQ-ACK/SR in ascending order of pre-defined priority rule and drops certain CSI bit(s), if the total payload to be transmitted is greater than the capacity of the determined PUCCH format 2 resource or the PUCCH format 3 resource or the PUCCH format 4 resource using $M_{RB,min}^{PUCCH}$ PRBs.

Example 7 may include the subject matter of example 6 or some other example herein, wherein UE transmits the combined HARQ-ACK/SR and wideband CSI report bits using the CSI PUCCH resource, if the CSI PUCCH resource has higher payload carrying capacity than the determined PUCCH format 2 resource or PUCCH format 3 resource or PUCCH format 4 resource configured for HARQ-ACK transmission with higher layer parameter PUCCH-F2-simultaneous-HARQ-ACK-CSI=TRUE, or PUCCH-F3-simultaneous-HARQ-ACK-CSI=TRUE or PUCCH-F4-simultaneous-HARQ-ACK-CSI=TRUE and with $M_{RB,min}^{PUCCH}$ PRBs. UE selects $N_{CSI}^{reported}$ CSI report(s) for transmission together with HARQ-ACK/SR in ascending order of pre-defined priority rule and drops certain CSI bit(s), if the total payload to be transmitted is greater than the capacity of the CSI PUCCH resource.

Example 8 may include the subject matter of example 2 or some other example herein, wherein in case UE has CSI transmission occasion(s) configured with the same starting symbol as a HARQ-ACK/SR transmission, where the HARQ-ACK information to be transmitted is in response to a PDSCH reception with a corresponding PDCCH or in response to a PDCCH indicating SPS PDSCH release, and there are single or multiple sub-band CSI report(s) to transmit, UE first determines one multi-CSI PUCCH resource to combine one or multiple sub-band CSI report(s) onto it as described in claim 5 (assuming zero HARQ-ACK/SR bits) and in the next action, UE handles the multiplexing between HARQ-ACK/SR and the combined CSI bits. UE determines a PUCCH resource set from a number of configured PUCCH resource sets for HARQ-ACK/SR transmissions based on the total UCI payload to be transmitted. Subsequently, UE determines a PUCCH format 3 resource or PUCCH format 4 resource with higher layer parameter PUCCH-F3-simultaneous-HARQ-ACK-CSI=TRUE or PUCCH-F4-simultaneous-HARQ-ACK-CSI=TRUE within the determined PUCCH resource set based on a PUCCH resource indicator field in a last DCI (downlink control information) format 1_0 or DCI format 1_1 that the UE detects and for which UE transmits corresponding HARQ-ACK information in the PUCCH. On the determined PUCCH resource, UE transmits the combined HARQ-ACK/SR and wideband CSI reports bits using $M_{RB,min}^{PUCCH}$ PRBs selected as described in claim 3. UE selects $N_{CSI\text{-}part2}^{reported}$ CSI part 2 report(s) for transmission together with HARQ-ACK/SR and CSI part 1, in ascending order of pre-defined priority rule and drops certain CSI part 2 bit(s), if the total payload to be transmitted is greater than the capacity of the determined PUCCH format 3 resource or PUCCH format 4 resource using $M_{RB,min}^{PUCCH}$ PRBs. UE drops all CSI part 2 report(s) and selects $N_{CSI\text{-}part1}^{reported}$ CSI part 1 report(s) for transmission together with HARQ-ACK/SR, in ascending order of pre-defined priority rule and drops certain CSI part 1 bit(s), if the total payload of HARQ-ACK/SR and CSI part1 report(s) is greater than the capacity of the determined PUCCH format 3 resource or PUCCH format 4 resource using $M_{RB,min}^{PUCCH}$ PRBs.

Example 9 may include the subject matter of example 8 or some other example herein, wherein UE transmits the combined HARQ-ACK/SR and sub-band CSI report bits using the CSI PUCCH resource, if the CSI PUCCH resource has higher payload carrying capacity than the determined PUCCH format 3 resource or PUCCH format 4 resource configured for HARQ-ACK transmission with higher layer parameter PUCCH-F3-simultaneous-HARQ-ACK-CSI=TRUE or PUCCH-F4-simultaneous-HARQ-ACK-CSI=TRUE and with $M_{RB,min}^{PUCCH}$ PRBs. UE selects $N_{CSI\text{-}part2}^{reported}$ CSI part 2 report(s) for transmission together with HARQ-ACK/SR and CSI part 1, in ascending order of pre-defined priority rule and drops certain CSI part 2 bit(s), if the total payload to be transmitted is greater than the capacity of the CSI resource. UE drops all CSI part 2 report(s) and selects $N_{CSI}^{reported}$ CSI part 1 report(s) for transmission together with HARQ-ACK/SR, in ascending order of pre-defined priority rule and drops certain CSI part 1 bit(s), if the total payload of HARQ-ACK/SR and CSI part1 report(s) is greater than the capacity of the CSI resource.

Example 10 may include the subject matter of example 1 or some other example herein, wherein in case of partial overlapping of multiple uplink channels with different starting symbols, UE only transmits one of the uplink channels while other uplink channels are dropped in accordance with the priority rules configured by higher layers.

Example 11 may include the subject matter of example 10 or some other example herein, wherein in case UE has CSI transmission occasion(s) configured with the different starting symbols than HARQ-ACK/SR transmission, where the HARQ-ACK information, if any, is in response to a PDSCH reception without a corresponding PDCCH and there are single or multiple CSI PUCCH based-reports, UE either chooses a PUCCH resource with the earliest starting symbol (if there is only one PUCCH resource with an earliest starting symbol) or the UE chooses a PUCCH resource amongst more than one PUCCH resources with the same earliest starting symbol following the similar resource determination approach described in claim 5.

Example 12 may include the subject matter of example 10 or some other example herein, wherein in case UE has HARQ-ACK information to transmit in response to a PDSCH reception with a corresponding PDCCH or in response to a PDCCH indicating SPS PDSCH release, and the UE has multiple wideband/sub-band CSI reports to transmit in a PUCCH, where the configured PUCCH resources for HARQ-ACK/SR and CSI report(s) transmission have different starting symbols, UE first combines multiple PUCCH based wideband/sub-band CSI reports on a single multi-CSI PUCCH resource as described in claim 11 and subsequently multiplexes HARQ-ACK/SR and the combined wideband/sub-band CSI report on a PUCCH resource.

Example 13 may include the subject matter of example 10 or some other example herein, wherein in case UE has HARQ-ACK information to transmit in response to a PDSCH reception with a corresponding PDCCH or in response to a PDCCH indicating SPS PDSCH release, and the UE has wideband CSI report(s) to transmit in a PUCCH, where the configured PUCCH resources for HARQ-ACK and wideband CSI report(s) have different starting symbols, UE chooses to transmit HARQ-ACK/SR and drop CSI, if HARQ-ACK/SR is configured with PUCCH resource having earlier starting symbol than CSI PUCCH-based resource, or UE chooses to transmit CSI and drop HARQ-ACK/SR or transmit CSI and HARQ-ACK/SR on a PUCCH resource, if CSI PUCCH-based resource has earlier starting symbol than configured PUCCH resource for HARQ-ACK/SR.

Example 14 may include the subject matter of example 10 or some other example herein, wherein in case UE has HARQ-ACK information to transmit in response to a PDSCH reception with a corresponding PDCCH or in response to a PDCCH indicating SPS PDSCH release, and the UE has sub-band CSI report(s) to transmit in a PUCCH, where the configured PUCCH resources for HARQ-ACK and sub-band CSI report(s) have different starting symbols, UE chooses to transmit HARQ-ACK/SR and drop CSI, if HARQ-ACK/SR is configured with PUCCH resource having earlier starting symbol than CSI PUCCH-based resource or transmit CSI and HARQ-ACK/SR on a PUCCH resource, or UE chooses to transmit CSI and drop HARQ-ACK/SR, if CSI PUCCH-based resource has earlier starting symbol than configured PUCCH resource for HARQ-ACK/SR.

Example 15 may include the subject matter of example 10 or some other example herein, wherein in case UE has HARQ-ACK information to transmit in response to a PDSCH reception with a corresponding PDCCH or in response to a PDCCH indicating SPS PDSCH release, and the UE has sub-band CSI report(s) to transmit in a PUCCH, where the configured PUCCH resources for HARQ-ACK and wideband/sub-band CSI report(s) have different starting symbols, the UE first combines multiple PUCCH based wideband/sub-band CSI reports on a single multi-CSI PUCCH resource as described in claim 11 and subsequently determine the total payload size of combined CSI report and HARQ-ACK/SR. Based on the determined total payload size, UE determines a PUCCH resource set from multiple PUCCH resource sets, and then determines a PUCCH resource from the determined PUCCH resource set in accordance with PUCCH resource indicator field in a last DCI format 1_0 or DCI format 1_1 that the UE detects. If the starting symbol of the determined PUCCH resource is earlier than CSI PUCCH resource.

Example 16 may include the subject matter of example 15 or some other example herein, wherein the UE either drops CSI and transmits HARQ-ACK/SR in accordance with the HARQ-ACK/SR payload size and PUCCH resource indicator field in a last DCI format 1_0 or DCI format 1_1 that the UE detects, or UE combines CSI report and HARQ-ACK/SR and transmit the combined UCI on the determined PUCCH resource.

Example 17 may include the subject matter of example 15 or some other example herein, wherein If the starting symbol of the determined PUCCH resource is later than CSI PUCCH resource, UE drops HARQ-ACK/SR and transmits CSI report only on the determined CSI PUCCH resource, or UE drops CSI report and transmit HARQ-ACK/SR in accordance with the HARQ-ACK/SR payload size and PUCCH resource indicator field in a last DCI format 1_0 or DCI format 1_1 that the UE detects.

Example 18 may include the subject matter in examples 2 and 10 or some other example herein, wherein UE uses a reference payload size of CSI part 2 to determine the total payload size for multiple CSI reports or a combined CSI and HARQ-ACK/SR. The reference payload size of the CSI part 2 is determined assuming rank 1 transmission or the maximum rank which is configured for the UE. Alternatively, the reference payload size is determined based on the minimum or maximum payload size of CSI part 2 depending on the CSI configuration.

Example 19 may include one or more non-transitory, computer-readable media having instructions that, when executed, cause a user equipment (UE) in a new radio (NR) system to: determine a first physical uplink control channel (PUCCH) resource with a payload of a first size carrying a first uplink control information (UCI) in a first format; determine a second PUCCH resource with a payload of a second size carrying a second UCI in a second format; determine that the first PUCCH resource and the second PUCCH resource at least partially overlap; and multiplex the first UCI and the second UCI to be carried by the first PUCCH resource in the first format or by the second PUCCH resource in the second format.

Example 20 may include the one or more non-transitory computer-readable media of example 19 and/or some other examples herein, wherein the first size of the payload in the first PUCCH resource is larger than the second size of the payload in the second PUCCH resource, and the UE is caused to multiplex the first UCI and the second UCI to be carried by the first PUCCH resource in the first format.

Example 21 may include the one or more non-transitory computer-readable media of example 19 and/or some other examples herein, wherein the UE is caused to append the second UCI to the first UCI to form a combined payload carried by the first PUCCH resource in the first format.

Example 22 may include the one or more non-transitory computer-readable media of example 19 and/or some other examples herein, wherein the first PUCCH resource fully collides with the second PUCCH resource that the first PUCCH resource and the second PUCCH resource have a same starting symbol.

Example 23 may include the one or more non-transitory computer-readable media of example 19 and/or some other examples herein, wherein the first PUCCH resource partially overlaps with the second PUCCH resource that the first PUCCH resource has a starting symbol different from a starting symbol of the second PUCCH resource.

Example 24 may include the one or more non-transitory computer-readable media of example 19 and/or some other examples herein, wherein the first format is of a format to carry a payload of a larger size, and the second format is of a format to carry a payload of a smaller size.

Example 25 may include the one or more non-transitory computer-readable media of example 24 and/or some other examples herein, wherein the first format is of a format 2, 3, or 4 for a PUCCH resource, and the second format is of format 0 or 1 for a PUCCH resource.

Example 26 may include the one or more non-transitory computer-readable media of example 19 and/or some other examples herein, wherein the first UCI includes a hybrid automatic repeat request—acknowledgement (HARQ-ACK) feedback or a channel state information (CSI) report, and the second UCI includes a scheduling request (SR) or a HARQ-ACK feedback, and the UE is caused to multiplex the first UCI and the second UCI to form a combined payload to be carried by the first PUCCH resource in the first format.

Example 27 may include the one or more non-transitory computer-readable media of example 19 and/or some other examples herein, wherein the first PUCCH resource is determined based on a PUCCH resource indicator field in a downlink control information (DCI).

Example 28 may include the one or more non-transitory computer-readable media of example 19 and/or some other examples herein, wherein the first PUCCH resource partially overlaps with the second PUCCH resource that the first PUCCH resource has a starting symbol different from a starting symbol of the second PUCCH resource, the first size of the payload in the first PUCCH resource is larger than the second size of the payload in the second PUCCH resource, and the UE is caused to multiplex the first UCI and the second UCI to be carried by the first PUCCH resource in the first format.

Example 29 may include the one or more non-transitory computer-readable media of example 19 and/or some other examples herein, wherein the UE is caused to drop at least a part of the first UCI or the second UCI depending on a pre-defined priority rule to form a combined payload carried by the first PUCCH resource in the first format.

Example 30 may include one or more non-transitory, computer-readable media having instructions that, when executed, cause a base station in a new radio (NR) system to: determine a first configuration for a first physical uplink control channel (PUCCH) resource with a payload of a first size carrying a first uplink control information (UCI) in a first format from a user equipment (UE); determine a second configuration for a second PUCCH resource with a payload of a second size carrying a second UCI in a second format from the UE, wherein the first PUCCH resource and the second PUCCH resource at least partially overlap; indicate the first configuration and the second configuration to the UE; and receive a combined payload from the UE carried by the first PUCCH resource in the first format or by the second PUCCH resource in the second format, wherein the combined payload is obtained by multiplexing the first UCI and the second UCI.

Example 31 may include the one or more non-transitory computer-readable media of example 30 and/or some other examples herein, wherein the base station is caused to indicate the first configuration and the second configuration to the UE by a high layer signaling.

Example 32 may include the one or more non-transitory computer-readable media of example 30 and/or some other examples herein, wherein the first UCI includes a hybrid automatic repeat request—acknowledgement (HARQ-ACK) feedback or a channel state information (CSI) report, and the second UCI is a scheduling request (SR) or a HARQ-ACK feedback, and the UE is caused to multiplex the first UCI and the second UCI to form a combined payload to be carried by the first PUCCH resource in the first format.

Example 33 may include the one or more non-transitory computer-readable media of example 30 and/or some other examples herein, wherein the CSI report includes a channel quality indicator (CQI), a pre-coding matrix indicator (PMI), a CSI resource indicator (CRI), a rank indicator (RI), a layer 1-reference signal received power (L1-RSRP), or a beam related information.

Example 34 may include the one or more non-transitory computer-readable media of example 30 and/or some other examples herein, wherein the CSI report includes multiple PUCCH based wideband or sub-band CSI reports.

Example 35 may include the one or more non-transitory computer-readable media of example 30 and/or some other examples herein, wherein the HARQ-ACK feedback is scheduled by a physical downlink shared channel (PDSCH), or generated periodically without being scheduled by a PDSCH.

Example 36 may include the one or more non-transitory computer-readable media of example 30 and/or some other examples herein, wherein the HARQ-ACK feedback is in response to a physical downlink shared channel (PDSCH) reception without a corresponding physical downlink control channel (PDCCH) reception.

Example 37 may include the one or more non-transitory computer-readable media of example 30 and/or some other examples herein, wherein the HARQ-ACK feedback is in response to a physical downlink control channel (PDCCH) reception indicating semi-persistently scheduled (SPS) PDSCH release.

Example 38 may include an apparatus to be used in a user equipment (UE) in a new radio (NR) system, the apparatus comprising: processing circuitry to: determine a first physical uplink control channel (PUCCH) resource with a payload of a first size carrying a first uplink control information (UCI) in a first format; determine a second PUCCH resource with a payload of a second size carrying a second UCI in a second format; determine that the first PUCCH resource and the second PUCCH resource at least partially overlap; and multiplex the first UCI and the second UCI to obtain a combined payload to be carried by the first PUCCH resource in the first format or by the second PUCCH resource in the second format; and network circuitry, coupled with the processing circuitry, to deliver to a base station the combined payload carried by the first PUCCH resource in the first format or by the second PUCCH resource in the second format.

Example 39 may include the apparatus of example 38 and/or some other examples herein, wherein the combined payload is carried by a number of physical resource blocks (PRBs) smaller than a predetermined or preconfigured number of PRBs.

Example 40 may include the apparatus of example 38 and/or some other examples herein, wherein the combined payload is carried by a number of physical resource blocks (PRBs) that is determined by the base station and signaled to the user equipment (UE) through a high layer signaling.

Example 41 may include the apparatus of example 38 and/or some other examples herein, wherein the combined payload is carried by a number of physical resource blocks (PRBs) with indices that can be factorized into the form $2^i \cdot 3^j \cdot 5^k$, with i, j, k being integers.

Example 42 may include the apparatus of example 38 and/or some other examples herein, wherein the first size of the payload in the first PUCCH resource is larger than the second size of the payload in the second PUCCH resource, and the UE is caused to multiplex the first UCI and the second UCI to be carried by the first PUCCH resource in the first format.

Example 43 may include the apparatus of example 38 and/or some other examples herein, wherein the first format is of a format 2, 3, or 4 for a PUCCH resource, and the second format is of format 0 or 1 for a PUCCH resource.

Example 44 may include an apparatus comprising means to perform one or more elements of a method described in or related to any of examples 1-43, or any other method or process described herein.

Example 45 may include one or more non-transitory computer-readable media comprising instructions to cause an electronic device, upon execution of the instructions by one or more processors of the electronic device, to perform one or more elements of a method described in or related to any of examples 1-43, or any other method or process described herein.

Example 46 may include an apparatus comprising logic, modules, or circuitry to perform one or more elements of a method described in or related to any of examples 1-43, or any other method or process described herein.

Example 47 may include a method, technique, or process as described in or related to any of examples 1-43, or portions or parts thereof.

Example 48 may include an apparatus comprising: one or more processors and one or more computer readable media comprising instructions that, when executed by the one or more processors, cause the one or more processors to perform the method, techniques, or process as described in or related to any of examples 1-43, or portions thereof.

Example 49 may include a signal as described in or related to any of examples 1-43, or portions or parts thereof.

Example 50 may include a signal in a wireless network as shown and described herein.

Example 51 may include a method of communicating in a wireless network as shown and described herein.

Example 52 may include a system for providing wireless communication as shown and described herein.

Example 53 may include a device for providing wireless communication as shown and described herein.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

What is claimed is:

1. A user equipment (UE), comprising:
processing circuitry to:
receive, via a higher layer above a physical layer, a physical uplink control channel (PUCCH)-channel state information (CSI)-ResourceList to indicate a first set of one or more PUCCH resources for a CSI report and a multi-CSI-PUCCH-ResourceList to indicate a second set of one or more PUCCH resources for multiple CSI reports, wherein the first set of one or more PUCCH resources is to carry the CSI report in a first format;
determine a PUCCH resource from the first set of one or more PUCCH resources indicated by the PUCCH-CSI-ResourceList for multiplexed uplink control information (UCI) that includes a CSI report multiplexed in a same symbol with scheduling request (SR) information in the first format, wherein the first format is configured to carry the CSI report before the CSI report is multiplexed with the SR information, and the first format is different from a second format that is initially configured to carry the SR information, wherein the PUCCH resource for multiplexed UCI that includes the CSI report multiplexed in the same symbol with the SR information is a first PUCCH resource, and the SR information is initially configured to be carried by a second PUCCH resource, and wherein the first PUCCH resource collides with the second PUCCH resource, and the first PUCCH resource and the second PUCCH resource have a same starting symbol; and interface circuitry, coupled with the processing circuitry, to cause transmission of the multiplexed UCI to a base station on the determined PUCCH resource.

2. The UE of claim 1, wherein the determined PUCCH resource is a first PUCCH resource for the multiplexed UCI that includes the CSI report multiplexed with hybrid automatic repeat request-acknowledgement (HARQ-ACK) information and the SR information, wherein the HARQ-ACK information is a first HARQ-ACK information, wherein the SR information is a first SR information, wherein the multiplexed UCI is a first multiplexed UCI, and wherein the processing circuitry is further to:

determine one or more second PUCCH resources for multiple CSI reports from the second set of one or more PUCCH resources indicated by the multi-CSI-PUCCH-ResourceList for a second multiplexed UCI that includes the multiple CSI reports multiplexed with at least one of a second HARQ-ACK information or a second SR information;

wherein the interface circuitry is further to cause transmission of the second multiplexed UCI to the base station on the one or more second PUCCH resources.

3. The UE of claim 1, wherein the determined PUCCH resource for the multiplexed UCI is to have PUCCH format 2 resource 0, PUCCH format 3 resource 0, or PUCCH format 4 resource 0, depending on a total payload of the plurality of UCIs to be transmitted in the multiplexed UCI, and a payload size capacity of the PUCCH format 2 resource 0, the PUCCH format 3 resource 0, or the PUCCH format 4 resource 0.

4. The UE of claim 1, wherein the determined PUCCH resource for the multiplexed UCI is to have PUCCH format 2 resource j+1, PUCCH format 3 resource j+1, or PUCCH format 4 resource j+1, if a total payload of the plurality of UCIs to be transmitted in the multiplexed UCI is greater than a capacity of PUCCH format 2 resource j, PUCCH format 3 resource j, or PUCCH format 4 resource j, and less than or equal to a capacity of the PUCCH format 2 resource j+1, the PUCCH format 3 resource j+1, or the PUCCH format 4 resource j+1, respectively, wherein j is an integer.

5. The UE of claim 1, wherein the multiplexed UCI includes the CSI report multiplexed with hybrid automatic repeat request-acknowledgement (HARQ-ACK) information and the SR information, and wherein the HARQ-ACK information is in response to a physical downlink shared channel (PDSCH) reception without a corresponding PDCCH.

6. The UE of claim 1, wherein the processing circuitry is further to receive a number-of-physical resource block (PRB) parameters for PUCCH format 2 or a number-of-PRB parameters for PUCCH format 3 to be used with the PUCCH-CSI-ResourceList or the multi-CSI-PUCCH-ResourceList.

7. The UE of claim 1, wherein the PUCCH resource is determined from the first set of one or more PUCCH resources based on a PUCCH resource indicator field in a downlink control information (DCI).

8. The UE of claim 1, wherein the processing circuitry is to cause the UE to drop at least a part of the CSI report, or the SR information in the multiplexed UCI, depending on a pre-defined priority rule to form a combined payload carried by the determined PUCCH resource.

9. One or more non-transitory, computer-readable media having instructions that, when executed, cause a base station to:

determine configurations of a physical uplink control channel (PUCCH)-channel state information(CSI)-ResourceList to indicate a first set of one or more PUCCH resources for a CSI report and a multi-CSI-PUCCH-ResourceList to indicate a second set of one or more PUCCH resources for multiple CSI reports, wherein the first set of one or more PUCCH resources is to carry the CSI report in a first format;

indicate the configurations of the PUCCH-CSI-ResourceList and the multi-CSI-PUCCH-ResourceList to a user equipment (UE); and receive a multiplexed uplink control information (UCI) carried by a PUCCH resource selected from the first set of one or more PUCCH resources configured by the PUCCH-CSI-ResourceList, wherein the multiplexed UCI includes the CSI report multiplexed in a same symbol with scheduling request (SR) information in the first format, wherein the first format is configured to carry the CSI report before the CSI report is multiplexed with the SR information, and the first format is different from a second format that is initially configured to carry the SR information, wherein the PUCCH resource carrying the multiplexed UCI that includes the CSI report multiplexed in the same symbol with the SR information is a first PUCCH resource, and the SR information is initially configured to be carried by a second PUCCH resource, and wherein the first PUCCH resource collides with the second PUCCH resource, and the first PUCCH resource and the second PUCCH resource have a same starting symbol.

10. The one or more non-transitory, computer-readable media of claim 9, wherein the selected PUCCH resource is a first PUCCH resource for the multiplexed UCI that includes the CSI report multiplexed with hybrid automatic repeat request-acknowledgement (HARQ-ACK) information and the SR information, wherein the HARQ-ACK information is a first HARQ-ACK information, wherein the SR information is a first SR information, wherein the multiplexed UCI is a first multiplexed UCI, and wherein the instructions, when executed, further cause the base station to:

receive a second multiplexed UCI carried by one or more second PUCCH resources selected from the second set of one or more PUCCH resources configured by the multi-CSI-PUCCH-ResourceList, wherein the second multiplexed UCI includes the multiple CSI reports multiplexed with at least one of second HARQ-ACK information or second SR information.

11. The one or more non-transitory, computer-readable media of claim 9, wherein the selected PUCCH resource for the multiplexed UCI is to have PUCCH format 2 resource 0, PUCCH format 3 resource 0, or PUCCH format 4 resource 0, depending on a total payload of the plurality of UCIs to be transmitted in the multiplexed UCI, and a payload size capacity of the PUCCH format 2 resource 0, the PUCCH format 3 resource 0, or the PUC CH format 4 resource 0.

12. The one or more non-transitory, computer-readable media of claim 9, wherein the selected PUCCH resource for the multiplexed UCI is to have PUCCH format 2 resource j+1, PUCCH format 3 resource j+1, or PUCCH format 4 resource j+1, if a total payload of the plurality of UCIs to be transmitted in the multiplexed UCI is greater than a capacity of PUCCH format 2 resource j, PUCCH format 3 resource j, or PUCCH format 4 resource j, and less than or equal to a capacity of the PUCCH format 2 resource j+1, the PUCCH format 3 resource j+1, or the PUCCH format 4 resource j+1, respectively wherein j is an integer.

13. The one or more non-transitory, computer-readable media of claim 9, wherein the CSI report includes a channel quality indicator (CQI), a pre-coding matrix indicator (PMI), a CSI resource indicator (CRI), a rank indicator (RI), a layer 1-reference signal received power (L1-RSRP), or a beam related information.

14. The one or more non-transitory, computer-readable media of claim 9, wherein the instructions, when executed, further cause the base station to:
transmit or cause to transmit a downlink control information (DCI) including a PUCCH resource indicator field for the UE to select the PUCCH resource from the first set of one or more PUCCH resources.

15. The one or more non-transitory, computer-readable media of claim 9, wherein the multiplexed UCI includes the CSI report multiplexed with hybrid automatic repeat request-acknowledgement (HARQ-ACK) information and the SR information, and the HARQ-ACK information is scheduled by a physical downlink shared channel (PDSCH), or generated periodically without being scheduled by a PDSCH.

16. The one or more non-transitory, computer-readable media of claim 9, wherein the multiplexed UCI includes the CSI report multiplexed with hybrid automatic repeat request-acknowledgement (HARQ-ACK) information and the SR information, and the HARQ-ACK information is in response to a physical downlink shared channel (PDSCH) reception without a corresponding physical downlink control channel (PDCCH) reception.

17. The one or more non-transitory, computer-readable media of claim 9, wherein the multiplexed UCI includes the CSI report multiplexed with hybrid automatic repeat request-acknowledgement (HARQ-ACK) information and the SR information, and the HARQ-ACK information is in response to a physical downlink control channel (PDCCH) reception indicating semi-persistently scheduled (SPS) PDSCH release.

18. One or more non-transitory, computer-readable media having instructions that, when executed, cause a user equipment (UE) to:
receive, via a higher layer above a physical layer, a physical uplink control channel (PUCCH)-channel state information (CSI)-ResourceList to indicate a first set of one or more PUCCH resources for a CSI report and a multi-CSI-PUCCH-ResourceList to indicate a second set of one or more PUCCH resources for multiple CSI reports, wherein the first set of one or more PUCCH resources is to carry the CSI report in a first format;
determine a PUCCH resource from the first set of one or more PUCCH resources indicated by the PUCCH-CSI-ResourceList for multiplexed uplink control information (UCI) that includes a CSI report multiplexed in a same symbol with scheduling request (SR) information in the first format, wherein the first format is configured to carry the CSI report before the CSI report is multiplexed with the SR information, and the first format is different from a second format that is initially configured to carry the SR information, wherein the PUCCH resource for multiplexed UCI that includes the CSI report multiplexed in the same symbol with the SR information is a first PUCCH resource, and the SR information is initially configured to be carried by a second PUCCH resource, and wherein the first PUCCH resource collides with the second PUCCH resource, and the first PUCCH resource and the second PUCCH resource have a same starting symbol; and
transmit or cause to transmit the multiplexed UCI to a base station on the determined PUCCH resource.

19. The one or more non-transitory, computer-readable media of claim 18, wherein the determined PUCCH resource for the multiplexed UCI is to have PUCCH format 2 resource 0, PUCCH format 3 resource 0, or PUCCH format 4 resource 0, depending on a total payload of the plurality of UCIs to be transmitted in the multiplexed UCI, and a payload size capacity of the PUCCH format 2 resource 0, the PUCCH format 3 resource 0, or the PUC CH format 4 resource 0.

20. The one or more non-transitory, computer-readable media of claim 18, wherein the determined PUCCH resource for the multiplexed UCI is to have PUCCH format 2 resource j+1, PUCCH format 3 resource j+1, or PUCCH format 4 resource j+1, if a total payload of the plurality of UCIs to be transmitted in the multiplexed UCI is greater than a capacity of PUCCH format 2 resource j, PUCCH format 3 resource j, or PUCCH format 4 resource j, and less than or equal to a capacity of the PUCCH format 2 resource j+1, the PUCCH format 3 resource j+1, or the PUCCH format 4 resource j+1, respectively, wherein j is an integer.

21. The one or more non-transitory, computer-readable media of claim 18, wherein the multiplexed UCI is carried by a number of physical resource blocks (PRBs) with indices that can be factorized into the form $2^i \cdot 3^j \cdot 5^k$, with i, j, k being integers.

22. The one or more non-transitory, computer-readable media of claim 18, wherein the PUCCH resource is determined from the first set of one or more PUCCH resources based on a PUCCH resource indicator field in a downlink control information (DCI).

* * * * *